US012596337B2

(12) United States Patent
Shin et al.

(10) Patent No.: US 12,596,337 B2
(45) Date of Patent: Apr. 7, 2026

(54) ELECTRONIC DEVICE TO CONTROL AN APPLICATION BASED ON PREDICTED USE OF THE APPLICATION AND OPERATING METHOD THEREOF

(71) Applicant: SAMSUNG ELECTRONICS CO., LTD., Suwon-si (KR)

(72) Inventors: Youngsang Shin, Suwon-si (KR); Jaehwan Kwak, Suwon-si (KR); Yuna Kim, Suwon-si (KR); Taehyun Kim, Suwon-si (KR); Hyuncheol Park, Suwon-si (KR); Namgwon Lee, Suwon-si (KR); Euijin Je, Suwon-si (KR); Yewon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 378 days.

(21) Appl. No.: 18/105,320

(22) Filed: Feb. 3, 2023

(65) Prior Publication Data

US 2023/0213896 A1      Jul. 6, 2023

Related U.S. Application Data

(63) Continuation of application No. PCT/KR2022/021728, filed on Dec. 30, 2022.

(30) Foreign Application Priority Data

Dec. 31, 2021    (KR) ........................ 10-2021-0194551

(51) Int. Cl.
*G05B 13/02*        (2006.01)
(52) U.S. Cl.
CPC ................................ *G05B 13/0265* (2013.01)

(58) Field of Classification Search
CPC ... G05B 13/0265; G06F 9/30; G06F 9/30021; G06F 9/3842; G06F 9/451; H04N 21/44204; H04N 21/466; G06N 20/00
(Continued)

(56) References Cited

U.S. PATENT DOCUMENTS 6,839,071 B1    1/2005  Miyamoto
8,711,285 B2    4/2014  Yoshida et al.
(Continued)

FOREIGN PATENT DOCUMENTS

EP        3 486 769 A1    5/2019
EP        3 567 477 A1    11/2019
(Continued)

OTHER PUBLICATIONS

PCT/ISA/220; PCT/ISA/210; PCT/ISA/237 dated Apr. 7, 2023 in International Patent Application No. PCT/KR2022/021728.
(Continued)

*Primary Examiner* — Jigneshkumar C Patel
(74) *Attorney, Agent, or Firm* — STAAS & HALSEY LLP

(57)        ABSTRACT

An operating method of an electronic device includes receiving a request to control of at least one application that is providable by the electronic device, obtaining second information according to a machine learning model based on first information corresponding to a history of use regarding the at least one application and at least one support element. The machine learning model predicts at least a probability of use of the at least one support element which supports execution of the at least one application based on the first information, and the method executes a function corresponding to the request to control the at least one application to be provided by the electronic device, based on the second information including at least the probability of use of the at
(Continued)

∫ 700

START

RECEIVE COMMAND FOR REQUESTING CONTROL OF FIRST APPLICATION ⎯ S710

OBTAIN SECOND INFORMATION THROUGH MACHINE LEARNING MODEL THAT IS TRAINED BASED ON FIRST INFORMATION ⎯ S720

EXECUTE FUNCTION CORRESPONDING TO COMMAND, BASED ON SECOND INFORMATION ⎯ S730

END least one support element which supports the execution of the at least one application.

21 Claims, 31 Drawing Sheets

(58) Field of Classification Search
USPC .......................................................... 700/47
See application file for complete search history.

(56) References Cited

U.S. PATENT DOCUMENTS

| | | | |
|---|---|---|---|
| 9,762,723 | B2 | 9/2017 | Kim |
| 10,073,519 | B2 | 9/2018 | Mun et al. |
| 10,326,820 | B2 | 6/2019 | Koulomzin |
| 11,190,595 | B2 | 11/2021 | Sohn et al. |
| 2018/0143802 | A1 | 5/2018 | Jang |
| 2018/0285463 | A1 | 10/2018 | Choi et al. |
| 2019/0026212 | A1 | 1/2019 | Verkasalo |
| 2019/0042079 | A1* | 2/2019 | Choi ..................... G06F 3/0488 |
| 2019/0155622 | A1* | 5/2019 | Chen ..................... G06N 3/045 |
| 2019/0317662 | A1 | 10/2019 | Cho et al. |
| 2019/0347113 | A1* | 11/2019 | Ma ........................ G06F 9/4818 |
| 2021/0027203 | A1 | 1/2021 | Sharifi et al. |
| 2021/0158773 | A1 | 5/2021 | Cho et al. |
| 2021/0194883 | A1 | 6/2021 | Badhwar et al. |
| 2021/0208553 | A1 | 7/2021 | Funes |

FOREIGN PATENT DOCUMENTS

| | | |
|---|---|---|
| EP | 3 567 479 A1 | 11/2019 |
| JP | 2000-286880 | 10/2000 |
| JP | 2005-65118 | 3/2005 |
| JP | 2009-225306 | 10/2009 |
| JP | 6630276 B2 | 1/2020 |
| JP | 2020-047101 A | 3/2020 |
| JP | 6720170 B2 | 7/2020 |
| KR | 10-0211453 B1 | 8/1999 |
| KR | 10-1021795 B1 | 3/2011 |
| KR | 10-2012-0050613 | 5/2012 |
| KR | 10-2015-0024179 | 3/2015 |
| KR | 10-2015-0082083 | 7/2015 |
| KR | 10-2017-0050878 A | 5/2017 |
| KR | 10-1766847 | 8/2017 |
| KR | 10-2018-0096323 | 8/2018 |
| KR | 10-2019-0076295 A | 7/2019 |
| KR | 10-2019-0090078 | 7/2019 |
| KR | 10-2020124 | 11/2019 |
| KR | 10-2112931 | 5/2020 |
| KR | 10-2150508 | 9/2020 |
| KR | 10-2183140 | 11/2020 |
| KR | 10-2021-0062955 A | 6/2021 |

OTHER PUBLICATIONS

Large James et al: "A probabilistic 1-15 classifier ensemble weighting scheme based G05B on cross-validated accuracy estimates", G06N, Journal of Data Mining and Knowledge H04N, Discovery, Norwell, MA, US, vol. 33, No. 6, Jun. 17, 2019 (Jun. 17, 2019), pp. 1674-1709, XP037203708.

Extended European Search Report issued Feb. 19, 2025 for European Application No. 22916842.2.

Indian Office Action issued Feb. 23, 2026 for Application No. 202417057369.

Anomalous behavior detection-based approach for authenticating smart home system users by Noureddine Amraoui, Belhassen Zouari DOI:10.1007/s10207-021-00571-6.

* cited by examiner

200

PROCESSOR — 210

MEMORY — 215

FIG. 12

| | App1 | | | |
|---|---|---|---|---|
| | HISTORY OF USE | | | |
| | 1 | 2 | ⋯ | 10 |
| SUPPORT ELEMENT 1 | 0.15 | 0.25 | ⋯ | 0.18 |
| SUPPORT ELEMENT 2 | 0.25 | 0.30 | ⋯ | 0.36 |
| SUPPORT ELEMENT 3 | 0.6 | 0.4 | ⋯ | 0.45 |
| SUPPORT ELEMENT 4 | 0 | 0 | ⋯ | 0 |
| ⋮ | ⋮ | ⋮ | ⋮ | ⋮ |
| SUPPORT ELEMENT M | 0 | 0 | ⋯ | 0 |

| | App1 | | | |
|---|---|---|---|---|
| | HISTORY OF USE | | | |
| | 1 | 2 | ... | 10 |
| SUPPORT ELEMENT 1 | 0 | 0.3 | ... | 0.7 |
| SUPPORT ELEMENT 2 | 0.22 | 0.55 | ... | 0.1 |
| SUPPORT ELEMENT 3 | 0.5 | 0.2 | ... | 0.33 |
| SUPPORT ELEMENT 4 | 0 | 0 | ... | 0 |
| ⋮ | ⋮ | ⋮ | ⋮ | ⋮ |
| SUPPORT ELEMENT M | 0 | 0 | ... | 0 |

| | App1 HISTORY OF USE | | | | App2 HISTORY OF USE | | | | ... HISTORY OF USE | AppN HISTORY OF USE | | | |
|---|---|---|---|---|---|---|---|---|---|---|---|---|---|
| | 1 | 2 | ... | 10 | 1 | 2 | ... | 10 | | 1 | 2 | ... | 10 |
| SUPPORT ELEMENT 1 | 0.15 | 0.15 | ... | 0.15 | 0 | 0.3 | ... | 0.7 | | xx | xx | ... | xx |
| SUPPORT ELEMENT 2 | 0.25 | 0.25 | ... | 0.25 | 0.22 | 0.55 | ... | 0.1 | | xx | xx | ... | xx |
| SUPPORT ELEMENT 3 | 0.6 | 0.6 | ... | 0.6 | 0.5 | 0.2 | ... | 0.33 | | xx | xx | ... | xx |
| SUPPORT ELEMENT 4 | 0 | 0 | ... | 0 | 0 | 0 | ... | 0 | | xx | xx | ... | xx |
| ... | ... | ... | ... | ... | ... | ... | ... | ... | | ... | ... | ... | ... |
| SUPPORT ELEMENT 5 | 0 | 0 | ... | 0 | 0 | 0 | ... | 0 | | xx | xx | xx | xx |

FIG.  17

|  | 1 | 2 | 3 | 4 | ... |
|---|---|---|---|---|---|
| 1711 — Func a | 0.15 | 0.25 | 0.22 | 0.18 | ... |
| 1712 — Func b | 0.25 | 0.30 | 0.33 | 0.36 | ... |
| 1713 — Func c | 0.6 | 0.4 | 0.55 | 0.45 | ... |
| 1714 — Func d | 0 | 0 | 0 | 0 | ... |

1710

1720

XGBoost

1730

|  | PREDICTION |
|---|---|
| Func a | 0.16 |
| Func b | 0.39 |
| Func c | 0.52 |
| Func d | 0 |

FIG. 18

| | 1 | 2 | 3 | 4 | ... |
|---|---|---|---|---|---|
| Func a | 0.15 | 0.25 | 0.22 | 0.18 | ... |
| Func b | 0.25 | 0.30 | 0.33 | 0.36 | ... |
| Func c | 0.6 | 0.4 | 0.55 | 0.45 | ... |
| Func d | 0 | 0 | 0 | 0 | ... |

1711 — Func a
1712 — Func b
1713 — Func c
1714 — Func d

1710

Random Forest

1820

| | PREDICTION |
|---|---|
| Func a | 0.16 |
| Func b | 0.39 |
| Func c | 0.52 |
| Func d | 0 |

| | App1 | App1 | App1 | ⋯ | AppN |
|---|---|---|---|---|---|
| SUPPORT ELEMENT 1 | 0.2 | 0 | 0.2 | ⋯ | n1 |
| SUPPORT ELEMENT 1 | 0.4 | 0.3 | 0.1 | ⋯ | n2 |
| SUPPORT ELEMENT 3 | 0.5 | 0.1 | 0 | ⋯ | n3 |
| SUPPORT ELEMENT 4 | 0 | 0 | 0 | ⋯ | n4 |
| | | | | ⋮ | |
| SUPPORT ELEMENT M | 0 | 0 | 0 | ⋯ | nm |

Figure 24:
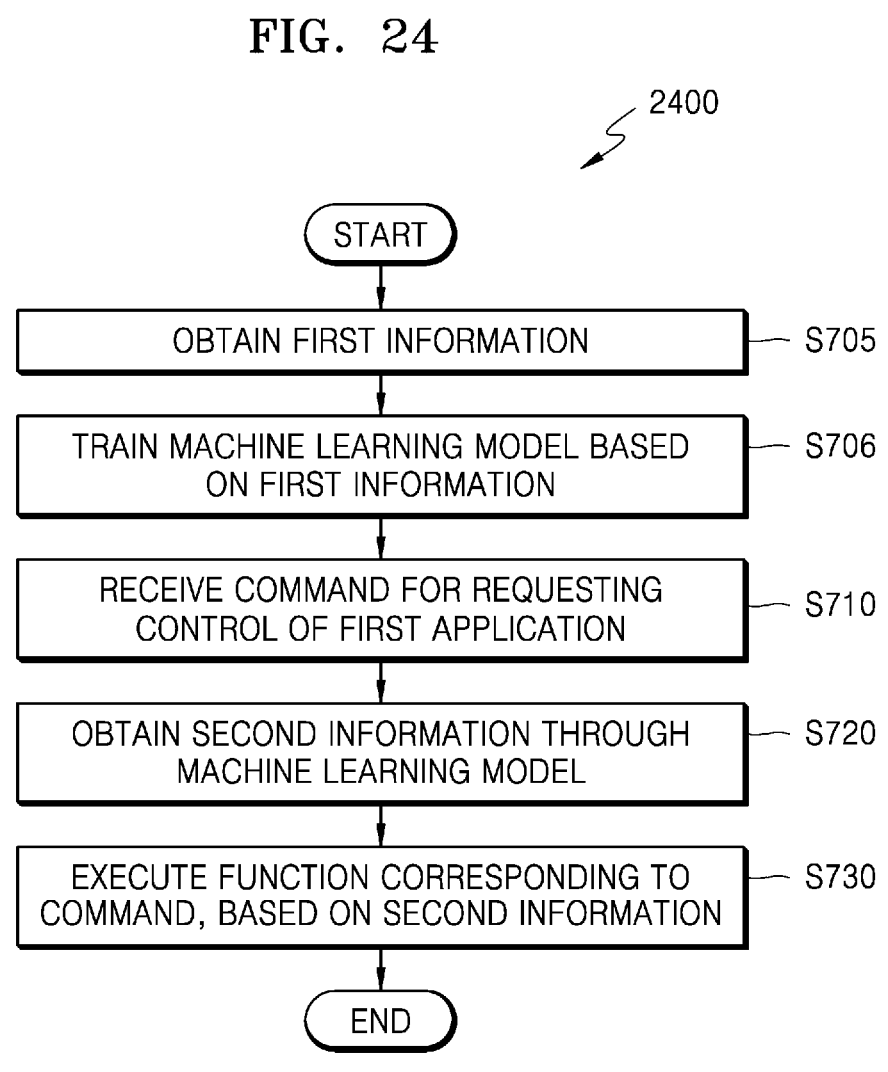

```
            ( START )
                |
                v
+------------------------------------+
|     OBTAIN FIRST INFORMATION       |—— S705
+------------------------------------+
                |
                v
+------------------------------------+
|  TRAIN MACHINE LEARNING MODEL BASED|—— S706
|        ON FIRST INFORMATION        |
+------------------------------------+
                |
                v
+------------------------------------+
|  RECEIVE COMMAND FOR REQUESTING    |—— S710
|  CONTROL OF FIRST APPLICATION      |
+------------------------------------+
                |
                v
+------------------------------------+
|  OBTAIN SECOND INFORMATION THROUGH |—— S720
|       MACHINE LEARNING MODEL       |
+------------------------------------+
                |
                v
+------------------------------------+
|  EXECUTE FUNCTION CORRESPONDING TO |—— S730
|COMMAND, BASED ON SECOND INFORMATION|
+------------------------------------+
                |
                v
             ( END )
```

ELECTRONIC DEVICE TO CONTROL AN APPLICATION BASED ON PREDICTED USE OF THE APPLICATION AND OPERATING METHOD THEREOF

CROSS-REFERENCE TO RELATED APPLICATIONS

This application is a continuation application, under 35 U.S.C. § 111(a), of international application No. PCT/KR2022/021728, filed on Dec. 30, 2022, which claims priority under 35 U.S.C. § 119 to Korean Patent Application No. 10-2021-0194551, filed on Dec. 31, 2021, the disclosures of which are incorporated herein by reference in their entirety.

BACKGROUND

Technical Field

The disclosure relates to an electronic device for performing various functions, and an operating method of the electronic device.

In particular, the disclosure relates to an electronic device for executing various applications for performing various functions, and an operating method of the electronic device.

Background Art

Electronic devices, such as computers, smart phones, tablet personal computers (PCs), or personal digital assistants (PDAs), have been frequently used by users. As electronic devices for personal use have become more widespread, electronic devices have been developed to provide users with various functions or services.

For example, with the development of communication techniques or communication connection functions applicable to electronic devices, electronic devices have been developed such that display devices provide various functions or services through wired/wireless communication with external devices. For example, an electronic device may be connected to an external device (e.g., a game console device or a content providing server) through wired/wireless communication, and provided with content (e.g., game content, movie content, or other video content) from the external device through the wired/wireless communication.

As described above, among various functions or services that may be provided by an electronic device, there may be a service desired by a user or a service not desired by the user. For example, in a case in which a request to execute a service that is not desired by a legitimate user of the electronic device (e.g., an owner or a registered user), not performing an operation according to the request may be in correspondence to an intention of the user. Accordingly, there is a need to provide a device and method for controlling execution of a certain service that may be performed by an electronic device, in correspondence to an intention of a user.

DESCRIPTION OF EMBODIMENTS

Technical Problem

An embodiment of the disclosure provides an electronic device for controlling execution of a requested service in correspondence to an intention of a user of the electronic device, and an operating method of the electronic device.

For example, an embodiment of the disclosure provides an electronic device for controlling, based on a history of use regarding the electronic device, execution of a requested service in correspondence to an intention of a user of the electronic device, and an operating method of the electronic device.

Solution to Problem

According to an embodiment of the disclosure, a method for operating an electronic device includes receiving a request to control at least one application that is providable by the electronic device, obtaining second information according to a machine learning model based on first information corresponding to a history of use regarding the at least one application and at least one support element, the machine learning model predicting at least a probability of use of the at least one support element which supports execution of the at least one application based on the first information, and executing a function corresponding to the request to control the at least one application to be provided by the electronic device, based on the second information at least the probability of use of the at least one support element which supports the execution of the at least one application.

For example, the machine learning model may be trained to predict the probability of use, based on a plurality of pieces of training data obtained by applying time windows to the first information, which is time-series data.

For example, execution of the function corresponding to the request may include executing the function corresponding to the request, based on a result of comparing the probability of use with a value.

For example, execution of the function corresponding to the request may include, based on the probability of use being less than or equal to a value, providing a user interface screen to confirm user information registered in the electronic device, and executing the function corresponding to the request, based on a user input received through the user interface screen.

For example, the obtaining of the second information may include inputting, to the machine learning model, at least one piece of data, which is included in the first information and is obtained during a time period before a time point at which the request is received, and obtaining, as the second information, output data output from the machine learning model.

For example, the method for operating the electronic device according to an embodiment of the disclosure may further include identifying whether to perform automatic control based on the second information, and based on identifying not to perform a function corresponding to the automatic control, executing, in response to the request being received, the function corresponding to the request.

For example, the first information is obtained based on information about at least one of frequencies of use or time periods of use of each of the at least one application and the at least one support element corresponding to the at least one application, during a time period.

For example, the obtaining of the second information may include inputting, to the machine learning model, data included in the time windows, which are set on the first information to correspond to a time point at which the request is received, and obtaining, as the second information, output data output from the machine learning model in response to the inputting of the data.

For example, the method for operating the electronic device according to an embodiment of the disclosure may further include, in response to the history of use regarding the at least one application and the at least one support element being newly generated, updating the first information based on the history of use that is newly generated.

For example, the method for operating the electronic device according to an embodiment of the disclosure may further include, in response to the first information being updated, training the machine learning model based on the updated first information.

According to an embodiment of the disclosure, an electronic device includes a memory to store at least one instruction, and a processor configured to execute the at least one instruction. The processor may be further configured to execute the at least one instruction to receive a request to control of at least one application that is providable by the electronic device, obtain second information according to a machine learning model based on first information corresponding to a history of use regarding the at least one application and at least one support element, the machine learning model predicting at least a probability of use of the at least one support element, which supports execution of the at least one application, based on the first information, and execute a function corresponding to the request to control the at least one application to be provided by the electronic device, based on the second information including at least the probability of use of the at least one support element used for execution of the at least one application.

For example, the machine learning model is trained to predict the probability of use, based on a plurality of pieces of training data obtained by applying time windows to the first information, which is time-series data.

For example, the processor may be further configured to execute the at least one instruction to execute the function corresponding to the request, based on a result of comparing the probability of use with a value.

For example, the electronic device according to an embodiment of the disclosure may further include a display, and a user interface. For example, the processor may be further configured to execute the at least one instruction to, based on the probability of use being less than or equal to a value, perform control such that a first user interface screen to confirm user information registered in the electronic device is displayed on the display, and execute the function corresponding to the request, based on a user input received through the user interface.

For example, the processor may be further configured to execute the at least one instruction to input, to the machine learning model, at least one piece of data, which is included in the first information and is obtained during a time period before a time point at which the request is received, and obtain, as the second information, output data output from the machine learning model.

For example, the processor may be further configured to execute the at least one instruction to identify whether to perform automatic control based on the second information, and based on identifying not to perform a function corresponding to the automatic control, execute, in response to the request being received, the function corresponding to the request.

For example, the processor may be further configured to execute the at least one instruction to obtain, as the first information, information about at least one of frequencies of use or time periods of use of each of the at least one application and the at least one support element corresponding to the at least one application, during a time period.

For example, the processor may be further configured to execute the at least one instruction to input, to the machine learning model, data included in the time windows, which are set on the first information to correspond to a time point at which the request is received, and obtain, as the second information, output data output from the machine learning model in response to the data input.

For example, the processor may be further configured to execute the at least one instruction to, in response to the history of use regarding the at least one application and the at least one support element being newly generated, update the first information based on the history of use that is newly generated.

For example, the processor may be further configured to execute the at least one instruction to, in response to the first information being updated, train the machine learning model based on the updated first information.

Advantageous Effects of Disclosure

An electronic device and an operating method thereof according to an embodiment of the disclosure may allow execution of a request to be automatically controlled in correspondence to an intention of a user of the electronic device. Accordingly, the electronic device and the operating method thereof according to an embodiment of the disclosure may increase user manipulation convenience and satisfaction.

BRIEF DESCRIPTION OF DRAWINGS

FIG. 12 is a diagram for describing first information obtained in an embodiment of the disclosure.

FIG. 13 is another diagram for describing first information obtained in in an embodiment of the disclosure.

FIG. 14 is another diagram for describing first information obtained in in an embodiment of the disclosure.

FIG. 17 is a diagram for describing a machine learning model used in an embodiment of the disclosure.

FIG. 18 is another diagram for describing a machine learning model used in an embodiment of the disclosure.

FIG. 20 is a diagram for describing second information obtained in an embodiment of the disclosure.

FIG. 24 is another flowchart illustrating an operating method of an electronic device, according to an embodiment of the disclosure.

FIG. 25 is another flowchart illustrating an operating method of an electronic device, according to an embodiment of the disclosure.

MODE OF DISCLOSURE

Figure 1:
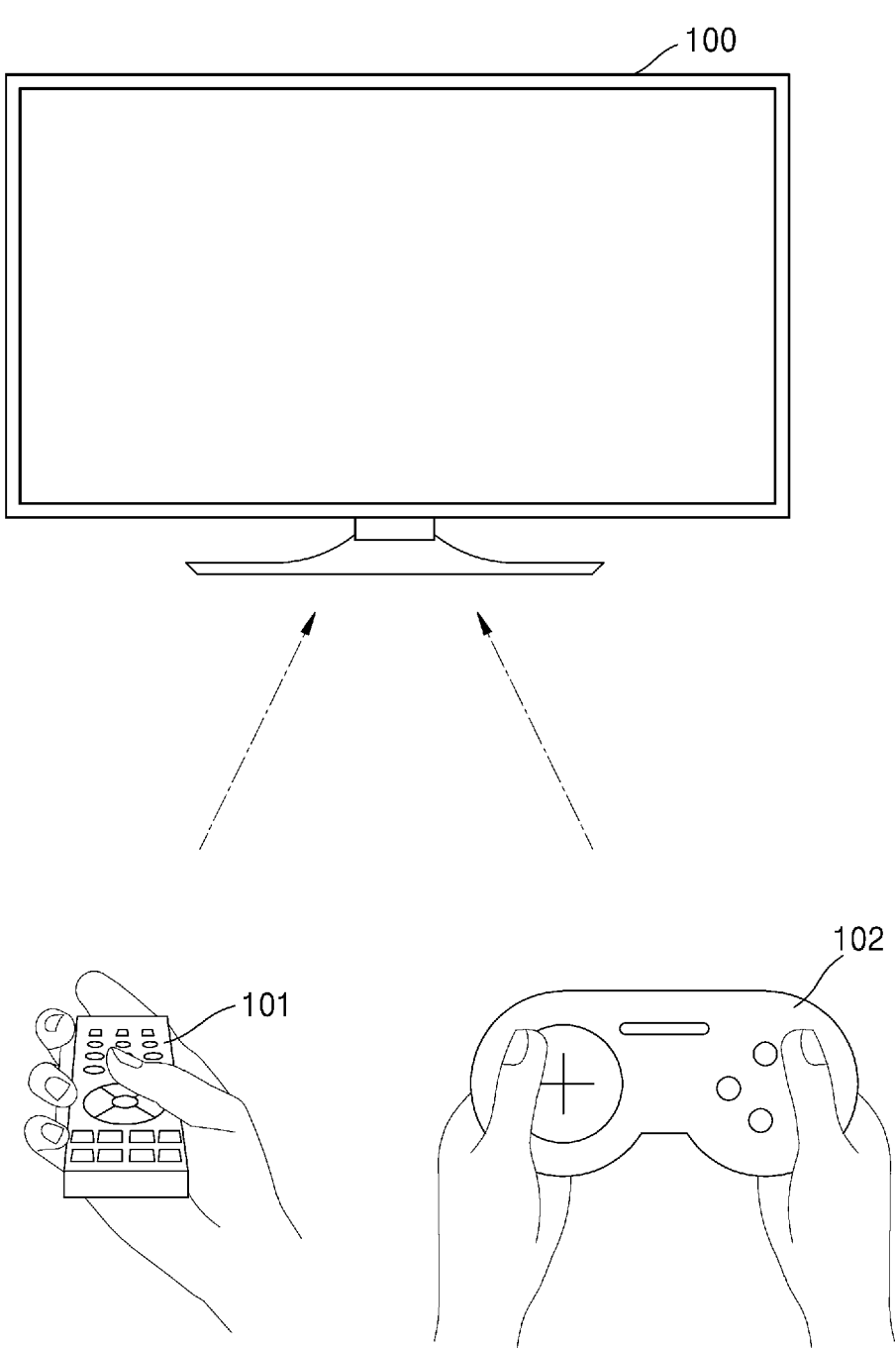
FIG. 1 is a diagram for describing an electronic device according to an embodiment of the disclosure.

Throughout the disclosure, the expression "at least one of a, b, or c" indicates only a, only b, only c, both a and b, both a and c, both b and c, all of a, b, and c, or variations thereof.

Hereinafter, embodiments of the disclosure are described in detail with reference to the accompanying drawings for those of skill in the art to be able to implement the embodiments of the disclosure without any difficulty. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the present specification. In addition, the same reference numerals designate the same components throughout the drawings.

Throughout the present specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

As used herein, phrases such as "in some embodiments" or "in an embodiment" does not necessarily indicate the same embodiment.

Some embodiments of the disclosure may be represented by functional blocks and various process operations. Some or all of the functional blocks may be implemented by any number of hardware and/or software elements that perform particular functions. For example, the functional blocks of the disclosure may be implemented by using one or more processors or microprocessors, or circuit elements for performing intended functions. For example, the functional blocks of the disclosure may be implemented by using various programming or scripting languages. The functional blocks may be implemented by using various algorithms executable by one or more processors. Furthermore, the disclosure may employ known technologies for electronic settings, signal processing, and/or data processing. Terms such as 'module' or 'component' may be used broadly and may not be limited to mechanical and physical elements.

In addition, connection lines or connection members between components illustrated in the drawings are merely exemplary of functional connections and/or physical or circuit connections. Various alternative or additional functional connections, physical connections or circuit connections may be present in a practical device.

Also, the expression "at least one of A, B, or C" indicates any of "A", "B", "C", "A and B", "A and C", "B and C", and "A, B, and C".

FIG. 1 is a diagram for describing an electronic device 100 according to an embodiment of the disclosure.

An electronic device according to an embodiment of the disclosure is a computing device capable of providing various functions or services, and may be implemented in various forms, such as, a television (TV), a digital TV (or a smart TV), a set-top box (STB), a mobile phone, a tablet PC, a content reproduction device, a digital camera, a camcorder, a laptop computer, a desktop computer, an electronic book terminal, a digital broadcasting terminal, a personal digital assistant (PDA), a portable multimedia player (PMP), a navigation device, an MP3 player, a wearable device, or a watch. Also, the electronic device according to an embodiment of the disclosure may be a digital appliance (DA), such as a refrigerator, an air purifier, a washing machine, a dryer, a cleaner, a heating device, a clock, or an alarm device. In addition, the electronic device may be a stationary electronic device arranged at a fixed position, may be a mobile electronic device that is portable, or may be a digital broadcast receiver capable of receiving a digital broadcast signal.

With the development of techniques for electronic devices, electronic devices capable of realizing various functions or services have been developed. For example, a digital TV may provide various functions or services to a user in addition to a broadcast content providing function according to broadcast reception, which is its representative function. For example, the digital TV may provide a game function, a video call function, a home training service, and a video content reproduction service.

As described above, among various functions or services that may be provided by the electronic device, there may be a service desired by a user or a service not desired by the user.

Alternatively, there may be a case in which a service is requested while another service is being provided by the electronic device but such a control request is not intended by a user having a legitimate or preferential right with respect to the electronic device.

Hereinafter, for convenience of description, for example, a user having a right to control or manage an electronic device, or a legitimate use right or a preferential use right with respect to an electronic device is referred to as a 'registered user'.

FIG. 1 illustrates an example in which the electronic device 100 according to an embodiment of the disclosure is a display device (e.g., a digital TV) that includes a display and visually outputs image data.

Referring to FIG. 1, in a case in which the electronic device 100 is a digital TV including a display, the electronic device 100 may perform various functions, such as a broadcast content providing function, a video reproduction function, or a game function.

For example, a registered user of the electronic device 100 may be viewing an audiovisual material. While the registered user is viewing video content, a user other than the registered user may attempt to stop the reproduction of the video content by using a remote control device 101 capable of controlling the electronic device 100.

In the above example, when the electronic device 100 receives a command (request) from the remote control device 101 and executes the received command to stop the reproduction of the video content, the electronic device 100 operates irrespective of an intention of the registered user. Accordingly, it may cause inconvenience to the registered user of the electronic device 100.

As another example, the registered user of the electronic device 100 may be using game content by using a game controller 102. That is, the electronic device 100 is performing a game function. While the registered user is playing a game, a user other than the registered user may input, to the electronic device 100, a command to stop the execution of the game and reproduce broadcast content, by using the remote control device 101 capable of controlling the electronic device 100.

In the above example, when the game is stopped by executing the command received from the remote control device 101, the electronic device 100 operates irrespective of an intention of the registered user. Accordingly, it may cause inconvenience to the registered user of the electronic device 100.

As in the above example, when the electronic device 100 that provides various functions operates irrespective of an intention of a user having a legitimate use right (e.g., the 'registered user'), it is necessary to prevent such inconvenience to the registered user.

Hereinafter, an electronic device and an operating method thereof according to an embodiment of the disclosure, for enabling the electronic device to operate in correspondence to an intention of a user who has a legitimate use right, by automatically controlling execution of a received command in correspondence to an intention of a registered user are described in detail with reference to FIGS. 2 to 27.

Figure 2:
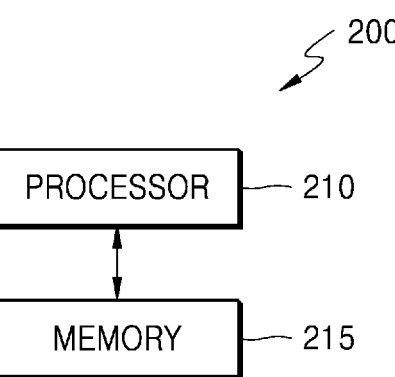
FIG. 2 is a block diagram illustrating an electronic device according to an embodiment of the disclosure.

FIG. 2 is a block diagram illustrating an electronic device 200 according to an embodiment of the disclosure. The electronic device 200 illustrated in FIG. 2 may correspond to the electronic device 100 illustrated in FIG. 1. Therefore, the descriptions provided above with reference to FIG. 1 are omitted.

Referring to FIG. 2, the electronic device 200 includes a memory 215 storing at least one instruction, and a processor 210 configured to execute the at least one instruction.

For example, the processor 210 may execute the at least one instruction to perform control such that an intended operation is performed. Here, the at least one instruction may be stored in an internal memory (not shown) included in the processor 210 or the memory 215 included in the electronic device 200 separately from the processor 210.

In detail, the processor 210 may execute the at least one instruction to control at least one component included in the electronic device 200 such that the intended operation is performed. Therefore, although an example in which the processor 210 performs certain operations is described, it may mean that the processor 210 controls at least one component included in the electronic device 200 to perform the operations.

Also, although an example in which the processor 210 is composed of one processor is illustrated and described, the processor 210 may include a plurality of processors.

For example, the processor 210 may include random-access memory (RAM) (not shown), which stores signals or data input from the outside of the electronic device 200 or is used as a storage for various operations performed by the electronic device 200, read-only memory (ROM) (not shown) storing a control program for controlling the electronic device 200, an application for providing a certain function or service, and/or a plurality of instructions, and at least one processor (not shown). The processor (not shown) may include a graphics processing unit (GPU) (not shown) for graphics processing on video. The processor (not shown) may be implemented as a system on a chip (SoC) in which a core (not shown) and the GPU (not shown) are integrated. In addition, the processor 210 may include a single processor core (single-core) or a plurality of processor cores (multi-core). For example, the processor 210 may be dual-core, triple-core, quad-core, hexa-core, octa-core, deca-core, dodeca-core, hexadecimal-core, etc.

The memory 215 may store at least one instruction, data, information, and/or an application. For example, the memory 215 may store the at least one instruction to be executed by the processor 210. For example, the memory 215 may store at least one program to be executed by the processor 210. For example, the memory 215 may store an application for providing a certain service.

For example, the memory 215 may include at least one of a flash memory-type storage medium, a hard disk-type storage medium, a multimedia card micro-type storage medium, a card-type memory (e.g., SD or XD memory), RAM, static RAM (SRAM), ROM, electrically erasable programmable ROM (EEPROM), programmable ROM (PROM), magnetic memory, a magnetic disk, or an optical disc.

In an embodiment of the disclosure, the processor 210 of the electronic device 200 executes the at least one instruction to perform control such that the following operations are performed. In detail, the processor 210 receives a command for requesting control of a first application among at least one application that may be provided by the electronic device 200. Then, the processor 210 obtains second information, which is output from a machine learning model that predicts, based on first information corresponding to a history of use regarding the at least one application and at least one support element used for execution of each of the at least one application, a probability of use of the at least one application and the at least one support element. Then, the processor 210 executes a function corresponding to the command, based on the second information indicating a first probability of use of a first application and a first support element used for execution of the first application.

For example, the processor 210 may control the execution of the received command, based on the second information.

For example, the processor 210 may or may not execute the received command, based on the second information. Here, executing a command may include driving, connecting to, activating, and/or using at least one support element such that a function corresponding to the command is executed. For example, in a case in which a command to execute a screen mirroring service is received, and the processor 210 determines, based on the second information, to execute a function corresponding to the command, the processor 210 may use support elements necessary for executing the screen mirroring service, such as, a Wi-Fi module. Accordingly, the processor 210 may provide the screen mirroring service based on mirroring data received through the Wi-Fi module.

For example, executing a function corresponding to a command may include executing a service requested through the received command or an application requested through the command. Alternatively, executing a function corresponding to a command may mean controlling an application corresponding to the received command to be executed, by using at least one support element corresponding to the application.

For example, the above-described machine learning model may be a machine learning model that is trained to predict a pattern of use regarding the electronic device 200 based on a history of use regarding an application and at least one support element corresponding to the application. For example, the pattern of use regarding the electronic device 200 may refer to a probability that an application and at least one support element corresponding to the application are used to be in the best correspondence to an intention of a legal user or a legitimate user of the electronic device 200.

For example, the electronic device 200 may store at least one application for performing a certain service or function, or a particular operation. Accordingly, the electronic device 200 may provide at least one service, function, or particular operation to the user.

For example, the term 'application' may refer to a program or a processor that performs a service, a function, or a particular operation. In detail, an application may include at least one instruction for performing a service, a function, or a particular operation. Also, an application may be stored in the processor 210 or the memory 215 included in the electronic device 200. Examples of applications that may be included or stored in the electronic device 200 include a broadcast content reproduction application, a video content providing application, a video conference application, a video call application, a video education application, a mirroring application, a game application, etc.

For example, an application may be produced by the manufacturer of the electronic device 200 and stored in the electronic device 200. Alternatively, an application may be produced or distributed by an application provider or a content provider.

For example, an application may be distributed (e.g., downloaded or uploaded) online through an application store (e.g., Galaxy Store). The online distribution may be performed through a server of a manufacturer, a server of an application store, a relay server, or the like.

When an application is executed, at least one task for allowing an intended operation to be performed may be performed. That is, execution of an application may involve execution of at least one task. In detail, execution of one application may involve execution of one task, or execution of one application may involve execution of a plurality of tasks.

For example, executing an application or executing a task involved by execution of an application may require an operation of at least one support element in the electronic device 200. For example, the support element may refer to at least one of hardware resources, modules, or systems, and/or at least one of software resources, modules, or systems, necessary for a certain operation, function, service, or application to be performed by the electronic device 200. For example, the support element may refer to hardware resources and/or software resources to be used by the electronic device 200 executing the application.

Here, the support elements that may be provided by the electronic device 200 are described in detail below with reference to FIGS. 8 to 11.

In addition, first information obtained by the electronic device 200 according to an embodiment of the disclosure is described in detail below with reference to FIGS. 12 to 14.

Furthermore, a machine learning model used by the electronic device 200 according to an embodiment of the disclosure is described in detail below with reference to FIGS. 15 to 19.

In addition, second information obtained by the electronic device 200 according to an embodiment of the disclosure is described in detail below with reference to FIGS. 17 to 20.

Figure 3:
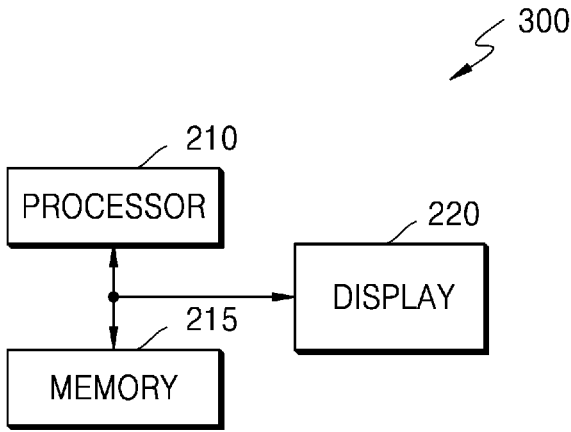
FIG. 3 is another block diagram illustrating an electronic device according to an embodiment of the disclosure.
Figure 4:
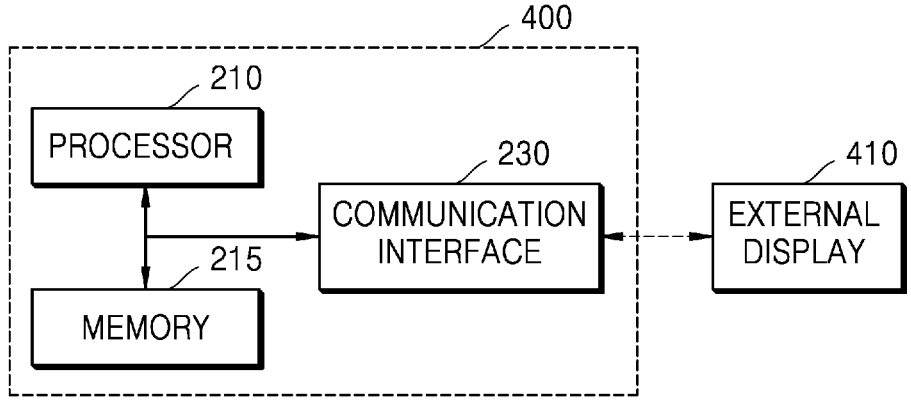
FIG. 4 is another block diagram illustrating an electronic device according to an embodiment of the disclosure.

FIG. 3 is another block diagram illustrating an electronic device 300 according to an embodiment of the disclosure. The electronic device 300 illustrated in FIG. 3 may correspond to the electronic device 100 or 200 described above with reference to FIG. 1 or FIG. 2. In addition, in FIG. 3, the same elements as those of FIG. 4 are illustrated by using the same reference numerals. Thus, the descriptions provided above with reference to FIGS. 1 and 2 are omitted.

Referring to FIG. 3, the electronic device 300 may be a display device that includes a display 220 and visually outputs image data. That is, the electronic device 300 may include the processor 210, the memory 215, and the display 220.

For example, the electronic device 300 including the display 220 may display at least one piece of content. For example, the electronic device 300 may be in various forms, such as a TV, a digital TV, a digital broadcasting terminal, a tablet PC, a smart phone, a mobile phone, a computer, or a notebook computer. Here, the digital TV may be referred to as a smart TV.

The display 220 may output an image on a screen under control by the processor 210. For example, the processor 210 may control the display 220 to output an intended image.

The display 220 outputs an image on the screen. For example, the display 220 may output an image corresponding to video data through a display panel (not shown) included therein so as to allow the user to visually recognize the video data. In detail, video data constituting content may include a plurality of frame images, and the display 220 may reproduce the video content by consecutively displaying the plurality of frame images under control by the processor 210.

For example, the display 220 may output a content image corresponding to video content on the screen under control by the processor 210.

FIG. 4 is another block diagram illustrating an electronic device 400 according to an embodiment of the disclosure. The electronic device 400 illustrated in FIG. 4 may correspond to the electronic device 100, 200, or 300 described above with reference to FIGS. 1 to 3. In addition, in FIG. 4, the same elements as those of FIG. 2 are illustrated by using the same reference numerals. Thus, the descriptions provided above with reference to FIGS. 1 to 3 are omitted.

Referring to FIG. 4, the electronic device 400 may include the processor 210, the memory 215, and a communication interface 230.

The communication interface 230 may communicate with at least one external device.

Here, the term 'communication' may refer to an operation of transmitting and/or receiving data, a signal, a request, and/or a command.

The communication interface 230 may perform wired or wireless communication with at least one external device. For example, the external device may be an external display 410. As another example, the external device (not shown) may be a source device, a server, a storage device, or the like capable of providing content. Alternatively, the external device (not shown) may be an Internet server or the like capable of providing content. Alternatively, the external device (not shown) may be an electronic device or a server capable of processing or providing data.

For example, the communication interface 230 may include at least one of a communication module, a communication circuit, a communication device, an input/output port, or an input/output plug for performing wired or wireless communication with at least one external device.

For example, the communication interface 230 may include at least one wireless communication module, wireless communication circuit, or wireless communication device configured to perform wireless communication with an external device, for example, a control device.

For example, the communication interface 230 may include a short-range communication module capable of receiving a control command from a remote controller (not shown) at a short distance, for example, an infrared (IR) communication module. In this case, the communication interface 230 may receive a control signal from the remote controller (not shown).

As another example, the communication interface 230 may include at least one communication module (not shown) configured to perform communication according to a wireless communication standard, such as Bluetooth, Wi-Fi, Bluetooth Low Energy (BLE), near-field communication (NFC)/radio frequency identification (RFID), Wi-Fi Direct, ultra-wideband (UWB), or Zigbee. Alternatively, the communication interface 230 may further include a communication module (not shown) configured to perform communication with a server (not shown) for supporting long-range communication according to a long-range communication standard. For example, the communication interface 230 may include a communication module (not shown) configured to perform communication through a network for Internet communication. In addition, the communication interface 230 may include a communication module (not shown) configured to perform communication through a communication network conforming to a mobile communication standard, such as 3rd Generation (3G), 4th Generation (4G), 5th Generation (5G), and/or 6th Generation (6G).

As another example, the communication interface 230 may include at least one port (not shown) for connecting to an external device through a cable in order to communicate with the external device in a wired manner. For example, the communication interface 230 may include any one of a high-definition multimedia interface (HDMI) port, a component jack, a PC port, or a Universal Serial Bus (USB) port. As such, the communication interface 230 may communicate with an external device connected thereto in a wired manner through the at least one port (not shown). Here, the term 'port' may refer to a physical device component to which a cable, a communication line, a plug, or the like may be connected or inserted.

As described above, the communication interface 230 may include at least one support element for supporting communication between the electronic device 400 and an external device. Here, the support elements may include the above-described communication modules, communication circuits, communication devices, ports (for data input/output), cable ports (for data input/output), plugs (for data input/output), and the like. Examples of the at least one support element included in the communication interface 230 may include an Ethernet communication module, a Wi-Fi communication module, a Bluetooth communication module, an IR communication module, a USB port, a tuner (or a broadcast receiver), an HDMI port, a DisplayPort (DP) port, a digital visual interface (DVI) port, and the like. Alternatively, the at least one support element may constitute the communication interface 230.

FIG. 4 illustrates an example in which the external device connected to the electronic device 400 is the external display 410. The electronic device 400 and the external display 410 may be connected to each other in a wired or wireless manner. For example, the electronic device 400 and the external display 410 may connect to and communicate with each other through an HDMI port included in the communication interface 230. As another example, the electronic device 400 and the external display 410 may communicate with each other through a Wi-Fi module included in the communication interface 230.

Referring to FIG. 4, the electronic device 400 may be an electronic device that does not include a display therein. For example, the electronic device 400 may be an STB. As another example, the electronic device 400 may be a content providing device or a content reproduction device.

Alternatively, the electronic device 400 may include a display (not shown) therein, but may perform control such that content received by the electronic device 400 or content stored in the electronic device 400, to be displayed on the external display 410 connected thereto through the communication interface 230, instead of the internal display. For example, the processor 210 may control the communication interface 230 such that content stored in the processor 210 or received through the communication interface 230 is transmitted to the external display 410. For example, the communication interface 230 may transmit content to the external display 410 under control by the processor 210. Then, the external display 410 may output the received content through a display panel (not shown) included therein. Accordingly, the user may visually recognize the content output through the external display 410.

Figure 5:
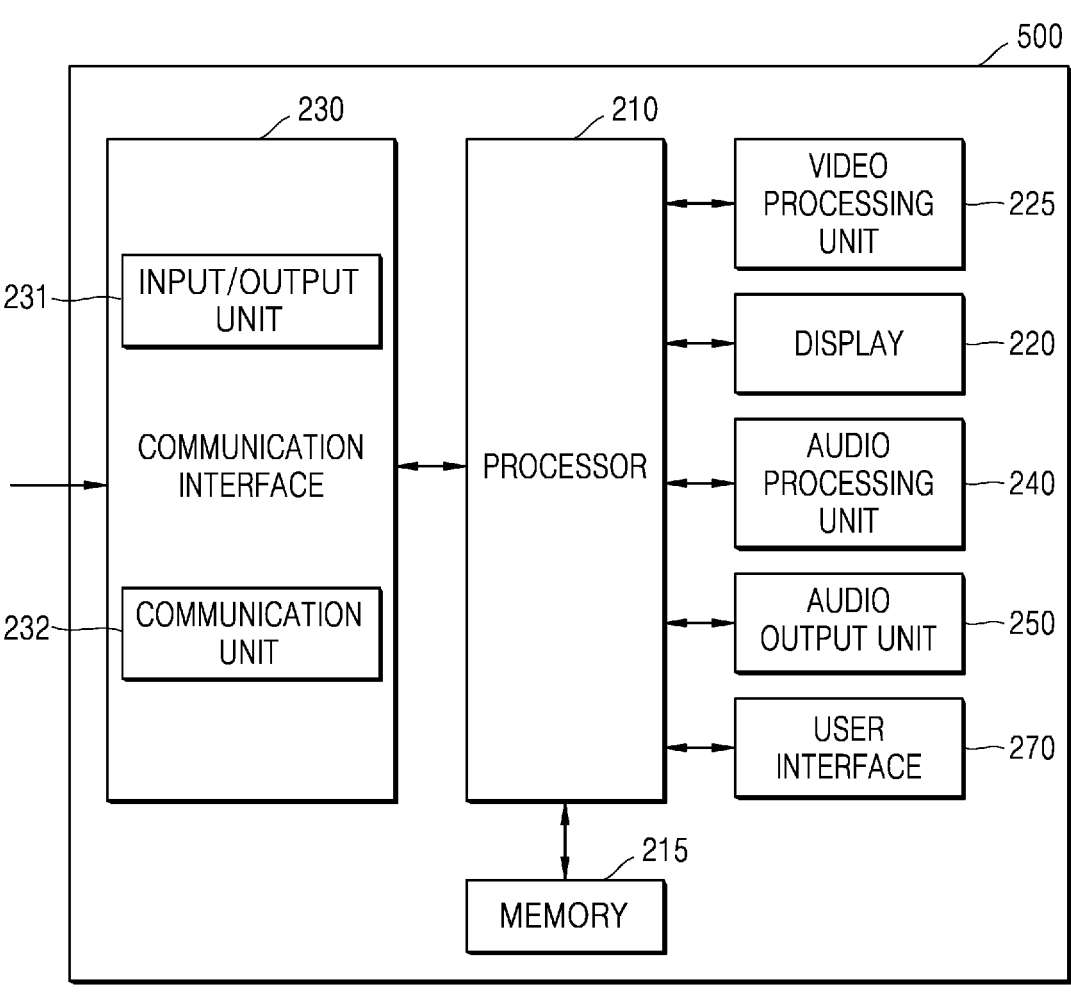
FIG. 5 is another block diagram illustrating an electronic device according to an embodiment of the disclosure.

FIG. 5 is another block diagram illustrating an electronic device 500 according to an embodiment of the disclosure.

In FIG. 5, the same elements as those of FIGS. 2 to 4 are illustrated by using the same reference numerals. The electronic device 500 illustrated in FIG. 5 may correspond to the electronic device 100, 200, 300, or 400 described above with reference to FIGS. 1 to 4. Therefore, in describing the display device 500, the descriptions provided above with reference to FIGS. 1 to 4 are omitted.

Referring to FIG. 5, the electronic device 500 may further include at least one of the display 220, an image processing unit 225, an audio processing unit 240, an audio output unit 250, the memory 215, or a user interface 270, in addition to the components of the display device 300 illustrated in FIG. 2.

For example, the display device 500 may further include the image processing unit 225 and the audio processing unit 240, in addition to the components of the display device 200 illustrated in FIG. 2.

Also, the display device 500 may further include the display 220, the image processing unit 225, the audio processing unit 240, and the audio output unit 250, in addition to the components of the display device 200 illustrated in FIG. 2. Also, the display device 500 may further include at least one of the memory 215 or the user interface 270, in addition to the components of the display device 200 illustrated in FIG. 2.

The communication interface 230 may receive image data and audio data from a source device according to a protocol used for connection therebetween, and output the received image data and audio data to the image processing unit 225 and the audio processing unit 240, under control by the processor 210.

The communication interface 230 may include at least one communication module configured to transmit and receive at least one of data, signals, or commands to and from an external device (not shown), and at least one port. In detail, the communication interface 230 may include a communication unit 232 and an input/output unit 231.

The input/output unit 231 may include at least one of a module configured to receive a signal or data from an external device, or a module configured to output (or transmit) a signal or data to the external device.

For example, the input/output unit 231 may include at least one of an HDMI port (not shown), a component jack (not shown), a PC port (not shown), a DP port, a DVI port, a Thunderbolt port, a Sony/Philips Digital Interface (S/PDIF) port, or a USB port (not shown). Also, the input/output unit 231 may include a combination of an HDMI port, a component jack, a PC port, a DP port, a DVI port, a Thunderbolt port, an S/PDIF port, and a USB port. For example, the input/output unit 231 may directly receive video data (e.g., game content) to be reproduced by the display apparatus 500, through an HDMI port, a component jack, a PC port, a USB port, or the like.

For example, the input/output unit 231 may be connected to an external display (e.g., 410 in FIG. 4) in a wired manner by using an HDMI port. As another example, the input/output unit 231 may be connected to a source device (not shown) in a wired manner by using an HDMI port.

The communication unit 232 communicates with an external device through at least one wired or wireless communication network. For example, the communication unit 232 may communicate with a source device. In detail, the communication unit 232 may include at least one communication module, a communication circuit, and the like, and may transmit and receive data to and from an external device through the communication module and/or the communication circuit.

In detail, the communication unit 232 may include at least one communication module (not shown) configured to perform communication according to a communication standard, such as Bluetooth, Wi-Fi, BLE, NFC/RFID, Wi-Fi Direct, UWB, or Zigbee. In addition, the communication unit 232 may include a communication module (not shown) configured to perform communication through a network for Internet communication. Also, the communication unit 232 may include a communication network conforming to a mobile communication standard, such as 3G, 4G, 5G, and/or 6G.

For example, the communication unit 232 may include a communication module configured to receive a control signal or a control command from a remote controller (not shown) at a short distance, for example, an IR communication module. In this case, the communication unit 232 may receive a control command from the remote controller (not shown).

For example, the communication unit 232 may receive content from a content providing server. As another example, while the content is reproduced through the display device 500, the communication unit 232 may receive, from the remote controller (not shown), a control signal for controlling the reproduction of the content.

In an embodiment of the disclosure, the communication unit 232 may receive a 'control command' to described below with reference to FIG. 7. For example, the control command may be received in the form of audio data corresponding to a voice control function to be described below.

For example, the remote controller (not shown) communicating with the electronic device 500 may include a microphone for receiving a voice from a user. In detail, in order to provide the user with the voice control function, the remote controller may receive a voice of the user through a built-in microphone. In this case, the remote controller (not shown) may transmit, to the communication unit 232, audio data corresponding to the received voice. Then, the communication unit 232 may receive the audio data from the remote controller. For example, the audio data may correspond to a voice command of the user and may be in the form of a digital signal or an analog signal. For example, the audio data may be received through a Bluetooth module or a Wi-Fi module. In the above-described example, the processor 210 may control the electronic device 500 to perform an operation corresponding to the received audio data, based on the received audio data.

As another example, as an external device for controlling the electronic device 500, there may be provided a remote controller and a mobile device (e.g., a smart phone, an artificial intelligence (AI) speaker, or a terminal installed with a speech recognition application). For example, the electronic device 500 and the mobile device may transmit and receive data through an IR module, a Bluetooth module, or a Wi-Fi module included in the communication unit 232. When the electronic device 500 communicates with the mobile device, the user may input a voice through a microphone included in a smart phone. The smart phone may transmit, to the communication unit 232, audio data corresponding to the received voice. In the above-described example, the processor 210 may control the electronic device 500 to perform an operation corresponding to the received audio data, based on the received audio data.

The image processing unit 225 may process image data corresponding to content and output the processed image data to the display 220 under control by the processor 210. For example, the image processing unit 225 may process image data corresponding to content received through the communication interface 230, and output the processed image data to the display 220 under control by the processor 210.

For example, the image processing unit 225 may decode image data corresponding to content to generate image data that may be output on the display 220, and transmit the generated image data to the display 220, under control by the processor 210.

As another example, the image processing unit 225 may generate a user interface screen under control by the processor 210.

The display 220 may display, on the screen, image data received from the image processing unit 225. For example, the display 220 may output a screen in which game content is reproduced (e.g., a screen including a game image).

The audio processing unit 240 may convert audio data received from the communication interface 230 into analog audio data, and output the analog audio data to the audio output unit 250, under control by the processor 210.

The audio output unit 250 may output the received analog audio data through a speaker.

The memory 215 may store programs related to the operation of the electronic device 500 and various pieces of data generated during the operation of the electronic device 500. Alternatively, the memory 215 may store content received from an external device. Alternatively, the memory 215 may store data or information necessary for the operation of the electronic device 500.

The memory 215 may include at least one memory unit. Here, the at least one memory unit may include at least one of a flash memory-type storage medium, a hard disk-type storage medium, a multimedia card micro-type storage medium, a card-type memory (e.g., SD or XD memory), RAM, SRAM, ROM, EEPROM, PROM, magnetic memory, a magnetic disk, or an optical disc.

The user interface 270 may receive a user input for controlling the electronic device 500. The user interface 270 may include a user input device including a touch panel for detecting a touch of the user, a button for receiving a push operation of the user, a wheel for receiving a rotation operations of the user, a keyboard, a dome switch, and the like, but is not limited thereto.

In addition, the user interface 270 may include a speech recognition device (not shown) for speech recognition. For example, the speech recognition device may be a microphone, and may receive a voice command or voice request of a user. Accordingly, the processor 210 may control an operation corresponding to the voice command or voice request to be performed.

Also, the user interface 270 may include a motion sensor (not shown). For example, the motion sensor (not shown) may detect a motion of the display apparatus 500 and receive the detected motion as a user input. Also, the speech recognition device (e.g., a microphone) (not shown) and the motion sensor (not shown) may not be included in the user interface 172, but may be included in the display apparatus 500 as modules independent from the user interface 270.

For example, the processor 210 controls the overall operation of the display device 500 to process image data and audio data corresponding to content, display the processed image data on the display 220, and output the processed audio data through the audio output unit 250. For example, the processor 210 may store and execute a content reproduction application. As another example, in a case in which the content reproduction application is stored in the memory 215, the processor 210 may execute the content reproduction application stored in the memory 215 to perform control such that content is provided to the user.

Figure 6:
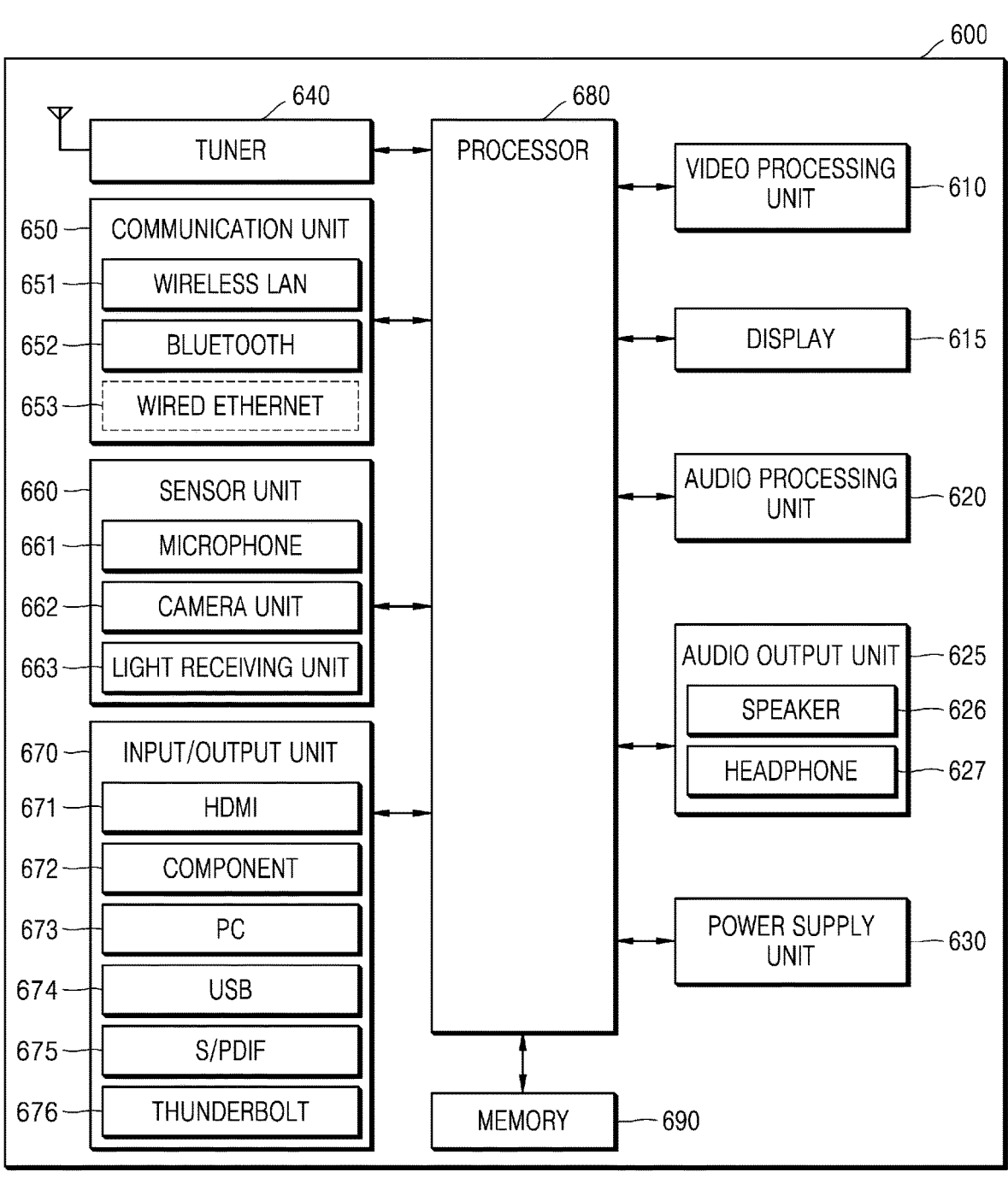
FIG. 6 is another block diagram illustrating an electronic device according to an embodiment of the disclosure.

FIG. 6 is another block diagram illustrating an electronic device 600 according to an embodiment of the disclosure. The display device 600 illustrated in FIG. 6 may correspond to the display device 100, 200, 300, 400, or 500 illustrated in FIGS. 1 to 5. Therefore, in describing the display device 600, the descriptions provided above with reference to FIGS. 1 to 5 are omitted.

Referring to FIG. 3, the display device 600 may include a video processing unit 610, a display 615, an audio processing unit 620, an audio output unit 625, a power supply unit 630, a tuner 640, a communication unit 650, a sensor unit 660, an input/output unit 670, a processor 680, and a memory 690.

The communication unit 650, the display 615, the input/output unit 670, the processor 680, the video processing unit 610, the audio processing unit 620, the audio output unit 625 and the memory 690 of the display device 600 may respectively correspond to the communication unit 232, the display 220, the input/output unit 231, the processor 210, the image processing unit 225, the audio processing unit 240, the audio output unit 250, and the memory 215, which are described above with reference to FIGS. 2 to 5. Therefore, in describing the display device 600, the descriptions provided above with reference to FIGS. 2 and 5 are omitted.

The video processing unit 610 processes video data received by the display device 600. The video processing unit 610 may perform various image processing operations, such as decoding, scaling, noise filtering, frame rate conversion, or resolution conversion, on the video data.

The display 615 may display, on a screen, a video included in a broadcast signal received through the tuner 640, under control by the processor 680. Also, the display 615 may display content (e.g., a video) input through the communication unit 650 or the input/output unit 670.

Also, the display 615 may output an image stored in the memory 690 under control by the processor 680. The display 615 may display a voice user interface (UI) (e.g., including a voice instruction guide) for performing a voice-recognized task corresponding to recognized voice, or a motion UI (e.g., including a user motion guide for motion recognition) for performing a motion-recognized task corresponding to a recognized motion.

The audio processing unit 620 processes audio data. The audio processing unit 620 may perform various processing operations, such as decoding, amplification, or noise filtering, on the audio data. In addition, the audio processing unit 620 may include a plurality of audio processing modules to process audio data corresponding to a plurality of content items.

The audio output unit 625 outputs an audio included in a broadcast signal received through the tuner 640 under control by the processor 680. The audio output unit 625 may output an audio (e.g., a voice or a sound) input through the communication unit 650 or the input/output unit 670. Also, the audio output unit 625 may output an audio stored in the memory 690 under control by the processor 680. The audio output unit 625 may include at least one of a speaker 626 or a headphone output port 627. The audio output unit 625 may include a combination of the speaker 626, the headphone output port 627, and an S/PDIF output port 628.

The power supply unit 630 supplies power input from an external power source, to the components 610 to 690 inside the display device 600 under control by the processor 680. In addition, the power supply unit 630 may supply power output from one or more batteries (not shown) located in the display device 600, to the internal components 310 to 390, under control by the processor 680.

The tuner 640 may be tuned to and select only a frequency of a channel desired to be received by the display device 600 from among a number of radio wave components by performing amplification, mixing, resonance, or the like on a broadcast signal received in a wired or wireless manner. The broadcast signal includes an audio, a video, and additional information (e.g., an electronic program guide (EPG)).

The tuner 640 may receive a broadcasting signal at a frequency bandwidth corresponding to a channel number (e.g., a cable broadcasting channel number 506), based on a user input (e.g., a control signal such as an input of a channel number, an input of channel up-down, or an input of a channel on an EPG screen, which is received from an external controller, such as a remote controller).

The tuner 640 may receive a broadcast signal from various sources, such as terrestrial, cable, satellite, and Internet broadcasters. The tuner 640 may also receive a broadcast signal from sources, such as analog or digital broadcasters. The broadcast signal received through the tuner 640 may be decoded (e.g., audio-decoded, video-decoded, or additional-information-decoded) and separated into audio, video, and/or additional information. The audio, video, and/or additional information may be stored in the memory 690 under control by the processor 680.

The display device 600 may include one or more tuners 640. According to an embodiment of the disclosure, in a case in which a plurality of tuners 640 are included in the display device 600, a plurality of broadcast signals may be output on a plurality of windows included in a multi-window screen provided on the display 615.

The tuner 640 may be integrated with the display device 600 in the form of an all-in-one device, or be implemented as a separate device having a tuner electrically connected to the display device 600 (e.g., an STB (not shown) or a tuner (not shown) connected to the input/output unit 670).

The communication unit 650 may connect the display device 600 to an external device (e.g., an external camera, a smart phone, or an audio device) under control by the processor 680. The processor 680 may transmit and receive content to and from an external device connected thereto, download an application from the external device, or perform web browsing, through the communication unit 650. In detail, the communication unit 650 may access a network to receive content from an external device (not shown).

As described above, the communication unit 650 may include at least one of a short-range wireless communication module (not shown), a wired communication module (not shown), or a mobile communication module (not shown).

FIG. 6 illustrates an example in which the communication unit 650 includes one of a wireless local area network (LAN) 651, a Bluetooth communication unit 652, and a wired Ethernet unit 653.

Also, the communication unit 650 may include a module combination including one or more of the wireless LAN 651, the Bluetooth communication unit 652, and the wired Ethernet unit 653. In addition, the communication unit 650 may receive a control signal from a control device (not shown) under control by the processor 680. The control signal may be implemented as a Bluetooth type, a radio frequency (RF) signal type, or a Wi-Fi type.

The communication unit 650 may further include an NFC module (not shown) or a separate BLE module (not shown), in addition to a Bluetooth module.

The sensor unit 660 detects a voice of the user, an image of the user, or an interaction of the user.

In an embodiment of the disclosure, the sensor unit 660 may obtain data for identifying a gesture of the user. In detail, the sensor unit 660 may include a camera unit 662, and may obtain data for identifying a gesture of the user (e.g., an image representing a gesture of the user), by using the camera unit 662. In addition, the sensor unit 660 may further include at least one of a microphone 661 or a light receiving unit 663.

The microphone 661 receives a voice uttered by the user. The microphone 661 may convert the received voice into an electrical signal and output the electrical signal to the processor 680. The voice of the user may include, for example, a voice corresponding to a menu or a function of the display device 600. For example, the recommended recognition range of the microphone 661 is a distance of 4 m from the microphone 661 to the location of the user, and may vary depending on a voice volume of the user and an ambient environment (e.g., a speaker volume and ambient noise).

The microphone 661 may be integrated with or separated from the display device 600. When separated, the microphone 661 may be electrically connected to the display device 600 through the communication unit 650 or the input/output unit 670.

It will be understood by those of skill in the art that the microphone 661 may be excluded depending on the performance and structure of the display device 600.

The camera unit 662 receives an image (e.g., consecutive frames) corresponding to a motion of the user, including a gesture, in a recognition range of a camera. For example, the recognition range of the camera unit 662 may be within a distance of 0.1 m to 5 m between the camera unit 662 and the user. The motion of the user may include, for example, a gesture or motion of a body part of the user, such as the face, a facial expression, a hand, a fist, or a finger. The camera unit 662 may convert the received image into an electrical signal and output the electrical signal to the processor 680, under control by the processor 680.

The processor 680 may select a menu to be displayed on the display device 600 or perform a control operation based on a result of recognizing the received motion. For example, channel adjustment, volume adjustment, and indicator movement may be included.

The camera unit 662 may include a lens (not shown) and an image sensor (not shown). The camera unit 662 may support optical zoom or digital zoom by using a plurality of lenses and image processing. The recognition range of the camera unit 662 may be variously set according to an angle of the camera and an ambient environment condition. In a case in which the camera unit 662 includes a plurality of cameras, a three-dimensional still image or a three-dimensional motion may be received by using the plurality of cameras.

The camera unit 662 may be integrated with or separate from the display device 600. A separate device (not shown) including the separate camera unit 662 may be electrically connected to the display device 600 through the communication unit 650 or the input/output unit 370.

It will be understood by those of skill in the art that the camera unit 662 may be excluded depending on the performance and structure of the display device 600.

The light receiving unit 663 receives an optical signal (including a control signal) from an external control device (not shown) through an optical window (not shown) of a bezel of the display 615. The light receiving unit 663 may receive, from the external control device (not shown), an optical signal corresponding to a user input (e.g., touch, push, a touch gesture, a voice, or a motion). A control signal may be extracted from the received optical signal, under control by the processor 680.

For example, the light receiving unit 663 may receive a signal corresponding to a pointing position of the control device (not shown) and transmit the signal to the processor 680. For example, in a case in which a UI screen for receiving data or a command from the user is displayed on the display 615 and the user intends to input data or a command to the display device 600 through the control device (not shown), and thus moves the control device (not shown) while touching a finger on a touch pad (not shown)

provided on the control device (not shown), the light receiving unit 663 may receive a signal corresponding to the motion of the control device (not shown), and transmit the signal to the processor 680. In addition, the light receiving unit 663 may receive a signal indicating that a particular button provided on the control device (not shown) is pressed, and transmit the signal to the processor 680. For example, when the user presses, with a finger, a button-type touch pad (not shown) provided on the control device (not shown), the light receiving unit 663 may receive a signal indicating that the button-type touch pad is pressed, and transmit the signal to the processor 680. For example, the signal indicating that the button-type touch pad is pressed may be used as a signal for selecting one of items.

The input/output unit 670 receives a video (e.g., a moving image), an audio (e.g., a voice or music), and additional information (e.g., an EPG) from outside the display device 600, under control by the processor 680. The input/output unit 670 may include one of an HDMI port 671, a component jack 672, a PC port 673, a USB port 674, an S/PDIF port 675, and a Thunderbolt port 676. The input/output unit 670 may include a combination of the HDMI port 671, the component jack 672, the PC port 673, the USB port 674, the S/PDIF port 675, and the Thunderbolt port 676.

As another example, the S/PDIP port 675 is for output interfacing of audio data, and thus may be regarded as a component included in the audio output unit 625.

It will be understood by those of skill in the art that the configuration and operation of the input/output unit 670 may be implemented in various ways according to an embodiment of the disclosure.

The processor 680 controls the overall operation of the display device 600 and signal flows between internal components (not shown) of the display device 600, and processes data. When a user input is received or a preset and stored condition is satisfied, the processor 680 may execute an operating system (OS) and various applications stored in the memory 690.

The processor 680 may include RAM (not shown) storing signals or data input from outside the display device 600 or used as a storage area for various operations performed by the display device 600, ROM (not shown) storing a control program for controlling the display device 600, and a processor (not shown).

The processor (not shown) may include a GPU (not shown) for graphics processing on a video. The processor (not shown) may be implemented as an SoC in which a core (not shown) and the GPU (not shown) are integrated. The processor (not shown) may include a single core, dual cores, triple cores, quad cores, or cores corresponding to a multiple thereof.

The processor (not shown) may include a plurality of processors. For example, the processor (not shown) may be implemented as a main processor (not shown) and a sub-processor (not shown) operating in a sleep mode.

The GPU (not shown) may generate a screen including various objects, such as an icon, an image, or a text, by using a calculation unit (not shown) and a rendering unit (not shown). The calculation unit may calculate attribute values, such as coordinates, a shape, a size, or a color of each object to be displayed, based on a screen layout by using a user interaction detected by a sensor unit (not shown). The rendering unit generates a screen of various layouts including objects, based on the attribute values calculated by the calculation unit. The screen generated by the rendering unit is displayed in a display area of the display 615.

Hereinafter, operations or control operations performed by the electronic device 100, 200, 300, 400, 500 or 600 according to an embodiment of the disclosure are described in detail with reference to FIGS. 7 to 28.

Figure 7:
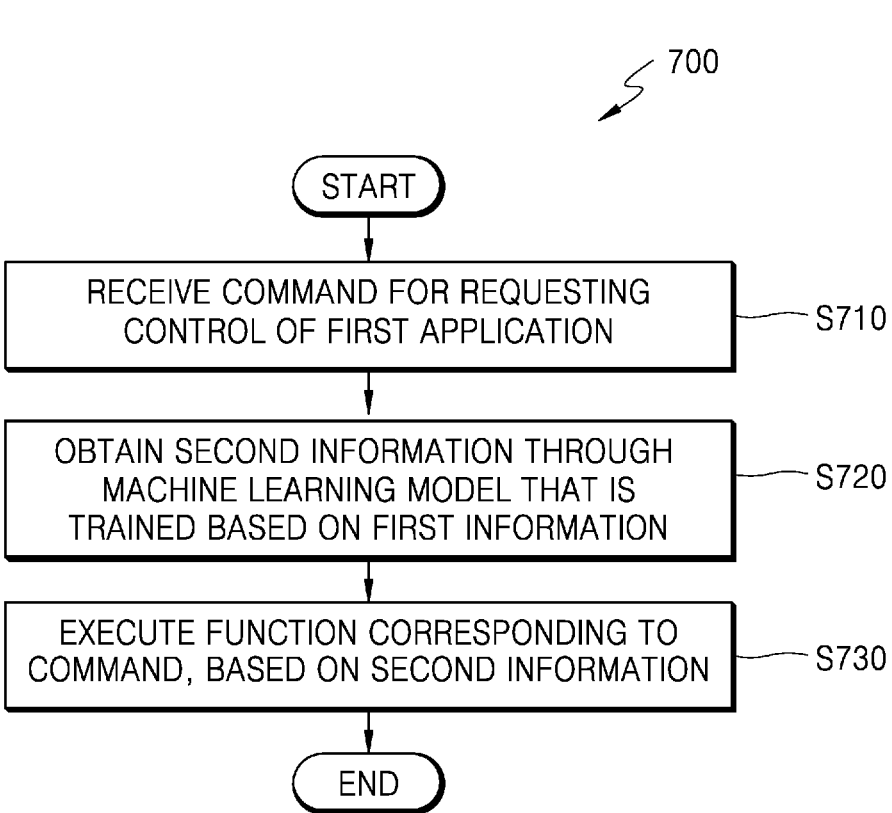
FIG. 7 is a flowchart illustrating an operating method of an electronic device, according to an embodiment of the disclosure.

FIG. 7 is a flowchart illustrating an operating method of an electronic device 700 according to an embodiment of the disclosure. The operating method 700 of the electronic device illustrated in FIG. 7 may correspond to operations performed by the electronic device 100, 200, 300, 400, 500 or 600 according to an embodiment of the disclosure described above with reference to FIGS. 1 to 6. Therefore, in describing the operations included in the operating method 700 of the electronic device, the descriptions provided above regarding the operations of the display apparatus 100, 200, 300, 400, 500, or 600 with reference to FIGS. 1 to 6 are omitted.

Hereinafter, for convenience of description, an example is described in which the operations included in the operating method 700 of the electronic device are performed by the electronic device 500 described above with reference to FIG. 5. In addition, hereinafter, the components illustrated in FIGS. 8 to 24 that are referred to in describing in detail the operations of the operating method 700 of the electronic device are described with reference to an example of the electronic device 500 described above with reference to FIG. 5.

Referring to FIG. 7, the operating method 700 of the electronic device includes receiving a command for requesting control of a first application among at least one application that may be provided by the electronic device 500 (S710). Hereinafter, for convenience of description, the 'command for requesting control of the first application' received in operation S710 is referred to as a 'control command'.

In an embodiment of the disclosure, the electronic device 500 is a computing device capable of providing various functions or services, and may execute a plurality of applications for providing a plurality of services. For example, the plurality of applications may be stored in at least one of the processor 210 or the memory 215.

When the user intends to receive any one of the plurality of services that may be provided by the electronic device 500, or to manipulate (e.g., to pause, terminate, or record) execution of a service being provided, the user may input, to the electronic device 500, a command corresponding to the intention.

For example, operation S710 may be performed by the communication interface 230 under control by the processor 210. For example, in a case in which an external device (e.g., a remote controller or a mobile device) for operating the electronic device 500 is wirelessly connected to the electronic device 500, the user may manipulate the external device to input a control command to the electronic device 500. In the above-described example, the electronic device 500 may receive the control command transmitted from the external device through the communication unit 232. Here, the control command may be generated in response to a physical manipulation of a button or a touch pad provided on the external device, or may be generated based on audio data corresponding to a user voice received from the external device. The control command generated by the external device may be received through the communication unit 232.

As another example, operation S710 may be performed by the UI 270 under control by the processor 210.

The UI 270 may receive a user input for controlling the electronic device 500. For example, the user input may correspond to control requested by the user, and may correspond to the above-described 'control command'. For example, the processor 210 may identify a control command based on a user input. For example, in a case in which the UI 270 includes a motion sensor, the motion sensor may detect a motion of the user, and then the processor 210 may identify a control command based on the detected motion.

In addition, control commands may be generated and received in various ways.

For example, the electronic device 500 may receive a control command for the first application while an application other than the first application is executed. Alternatively, the electronic device 500 may receive a control command for the first application while the first application is executed. The electronic device 500 in a standby state may receive a control command for starting execution of the first application.

Next, the operating method 700 of the electronic device includes obtaining second information, which is output from a machine learning model that predicts, based on first information corresponding to a history of use regarding the at least one application and at least one support element that is used for execution of each of the at least one application, a probability of use of the at least one application and the at least one support element. Operation S720 may be performed by the processor 210. In an embodiment of the disclosure, the machine learning model used to obtain the first information may be a trained machine learning model. For example, the machine learning model may be a machine learning model trained based on at least one piece of data included in the first information.

Next, the operating method 700 of the electronic device includes executing a function corresponding to the command, based on the second information indicating a first probability of use of the first application and a first support element that is used for execution of the first application (S730). Operation S730 may be performed by the processor 210.

For example, in a case in which the control command received in operation S710 is for requesting control of the first application, the first probability of use may be a probability of use of the first support element, which is the at least one support element corresponding to the first application. In addition, the first support element may refer to the at least one support element that is used to support execution of the first application or is used for execution of the first application.

First, hereinafter, the above-described 'support element' is described in detail with reference to FIGS. 8 to 11.

For example, the support element may refer to hardware (HVV) or software (SVV) resources, modules, and/or systems required for execution of functions, services, and/or applications that may be provided by the electronic device 500. For example, the support element may refer to at least one of HW resources, modules, or systems, and/or at least one of SW resources, modules, or systems required for the electronic device 200 to perform a certain operation, function, service, or application.

For example, in a case in which an application for providing video content (hereinafter, referred to as an 'video providing application') is installed in the electronic device 500, in order for the video providing application to provide video content, it is necessary to receive the video content from external devices. In this case, the video content may be received through various resources, modules, and systems. For example, the video content may be received through a wireless communication module (e.g., an Internet communication module, a Bluetooth module, a Wi-Fi module, a mobile communication module, or the like included in the communication unit 232 of FIG. 5) configured to perform communication with an external server through a wireless communication network. Alternatively, the video content may be received through at least one of an HDMI port, a component jack, a PC port, a DP port, a DVI port, a Thunderbolt port, or a USB port included in the input/output unit 231 of FIG. 5. Here, the above-described wireless communication modules and input/output ports may be support elements corresponding to the video providing application.

The support elements may be generated by or installed in the electronic device 500.

In an embodiment of the disclosure, the support elements generated by or installed in the electronic device 500 may be hierarchically classified, such as into higher-level support elements and lower-level support elements.

Here, the higher-level support elements may refer to functions, modules, or systems classified as higher-level entities, and the lower-level support elements may refer to functions, modules, or systems classified as lower-level entities included in the higher-level support elements.

Figure 8:
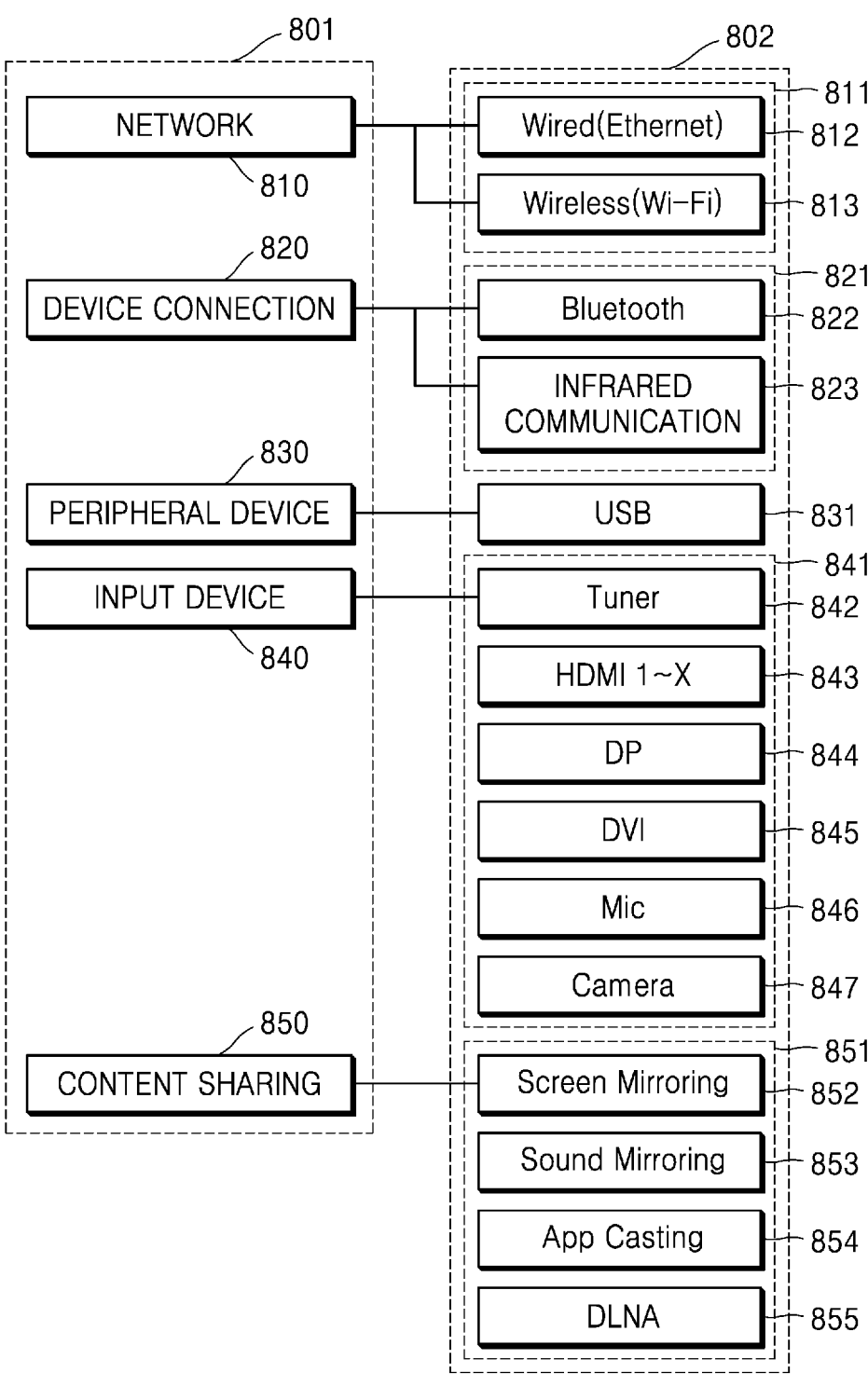
FIG. 8 is a diagram for describing support elements that may be provided by an electronic device, according to an embodiment of the disclosure.

FIG. 8 is a diagram for describing support elements that may be provided by an electronic device according to an embodiment of the disclosure.

Each of a plurality of applications included or installed in the electronic device 500 may perform an intended operation by using support elements.

Referring to FIG. 8, functional elements used or required to execute applications may be classified into functions 801 (hereinafter, also referred to as the higher-level entities 801) corresponding to higher-level entities, and lower-level functional elements 802 (hereinafter, also referred to as the lower-level entities 802) corresponding to higher-level functions, respectively.

For example, functions used or required to execute applications are classified as higher-level entities, for example, network entities 810, device connection entities 820, peripheral device entities 830, input device entities 840, and content sharing entities 850.

For example, functions used or required for execution of applications may be largely classified into functions implemented in terms of HW and functions implemented in terms of SW. For example, the network entities 810, the device connection entities 820, the peripheral device entities 830, and the input device entities 840 may correspond to functions implemented as HW elements, and the content sharing entities 850 may correspond to functions implemented as SW elements.

Referring to FIG. 8, the network entities 810 correspond to functions, modules, or systems to support the electronic device 500 to connect to a communication network, and may include support elements 811 required for the electronic device 500 to connect to a wired network. For example, the lower-level support elements 811 corresponding to the network entities 810 may include a wired communication module (e.g., an Ethernet module) 812, a wireless communication module (e.g., a Wi-Fi module) 813, and the like. In addition to the illustrated components, the lower-level support elements 811 may further include at least one of the communication modules described above with reference to the communication unit 232 of FIG. 5.

The device connection entities 820 corresponds to functions, modules, or systems to support wireless connection with an external device close to (e.g., at a certain distance from) the electronic device 500, and may include support elements 821. For example, the lower-level support elements 821 corresponding to the device connection entities 820 may include a Bluetooth module 822, an IR communication module 823, and the like. In addition to the illustrated components, the lower-level support elements 821 may further include at least one of the communication modules described above with reference to the communication unit 232 of FIG. 5.

The peripheral device entities 830 correspond to functions, modules, or systems to support connection to an input/output device or an auxiliary storage device connected to the electronic device 500, and may include support elements. For example, the lower-level support elements corresponding to the peripheral device entities 830 may include a USB unit 831 and the like.

The input device entities 840 correspond to functions, modules, or systems required for the electronic device 500 to receive data from an external device, and may include support elements 841. For example, the lower-level support elements 841 corresponding to the input device entities 840 may include a tuner 842, an HDMI port 842, a DP port 844, a DVI port 845, a microphone 846, a camera 847, and the like.

The content sharing entities 850 correspond to functions, modules, or systems required for the electronic device 500 to share content provided from an external device, and may include support elements 851. For example, the support elements 851 may include a screen mirroring function 852 for supporting a function for sharing image data, a sound mirroring function 853 for supporting a function of sharing sound data, an app casting function 854, a Digital Living Network Alliance (DLNA) function 855, and the like.

As illustrated in block 802 of FIG. 8, physical (HW) or SW devices, modules, systems, and the like that may be supported by the electronic device 500 may classified into the higher-level entities 801 and the lower-level entities 802 and then listed.

Referring back to FIG. 7, the 'support element' described above with reference to operation S710 may be a support element classified as the lower-level entities 802. Alternatively, the 'support element' described above with reference to operation S710 may be a function classified as the higher-level entities 801.

Figure 9:
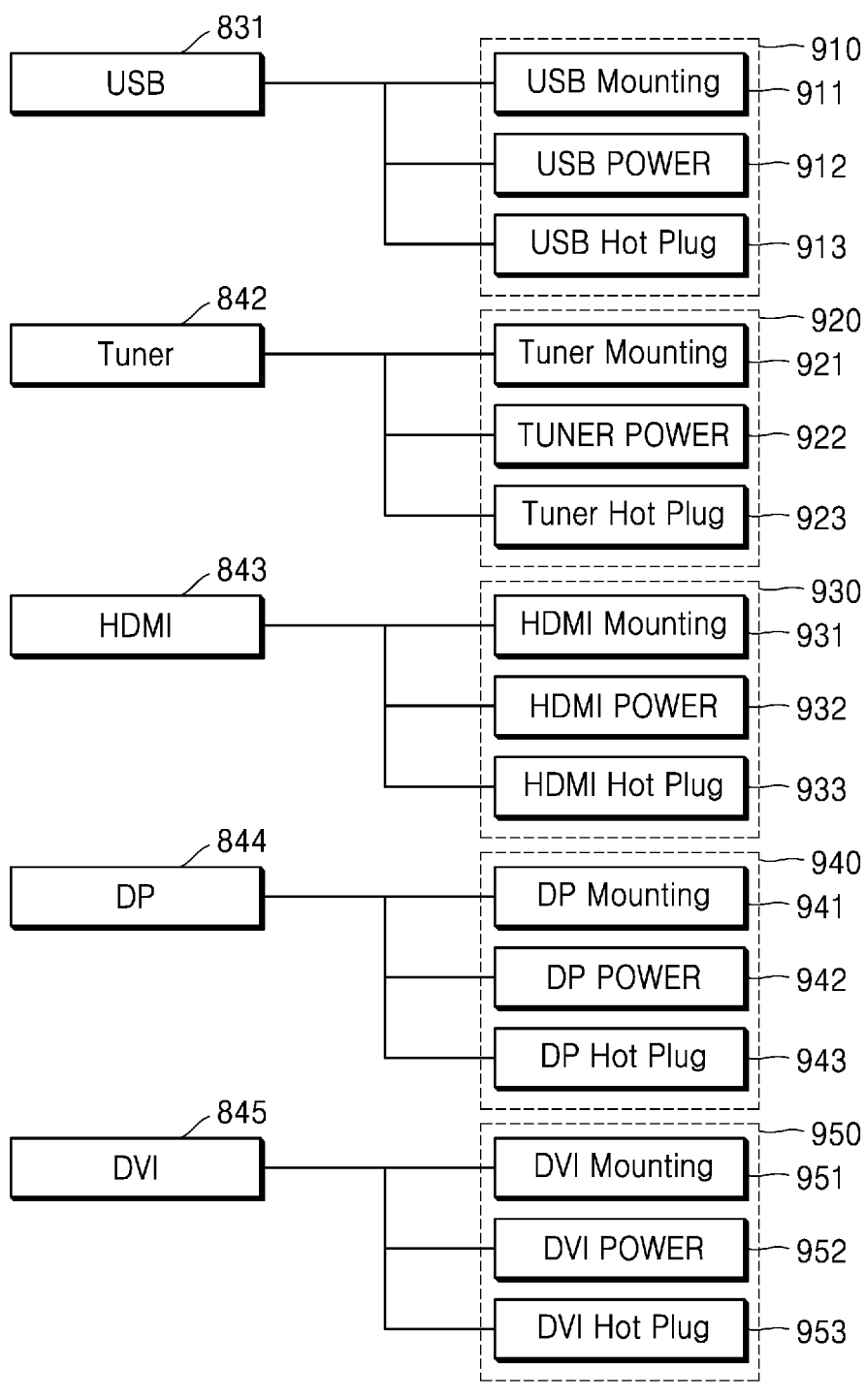
FIG. 9 is another diagram for describing support elements that may be provided by an electronic device, according to an embodiment of the disclosure.

FIG. 9 is another diagram for describing support elements that may be provided by an electronic device according to an embodiment of the disclosure. In FIG. 9, the same elements as those of FIG. 8 are illustrated by using the same reference numerals. Therefore, the descriptions provided above with reference to FIG. 8 are omitted.

Referring to FIG. 9, at least one of the support elements classified as the lower-level entities 802 described above with reference to FIG. 8 may include lowest-level support elements.

In FIG. 9, 'mounting' may refer to insertion of a device and a function of recognizing the inserted device. In addition, 'power' may refer to a power supply function. Furthermore, 'hot plug' may refer to a function of allowing the corresponding component to be mounted on a device and then immediately used without powering off the device.

FIG. 9 illustrates examples of lower-level support elements 910 included in the USB unit 831, lower-level support elements 920 included in the tuner 842, lower-level support elements 930 included in an HDMI port 843, lower-level support elements 940 included in the DP port 844, and lower-level support elements 950 included in the DVI port 845.

For example, the USB unit 831 may include a USB mounting function 911 for insertion of a USB device and recognition of the inserted USB device, a USB power supply unit 912 for supplying power through a USB port, and a hot plug unit 913 for implementing a hot plug function through the USB port.

Similarly to the lower-level support elements 910, the lower-level support elements 920 included in the tuner 842, the lower-level support elements 930 included in the HDMI port 843, the lower-level support elements 940 included in the DP port 844, and the lower-level support elements 950 included in the DVI port 845 may include support elements for supporting mounting, power supply and hot plug functions using corresponding ports or corresponding functions.

Figure 10:
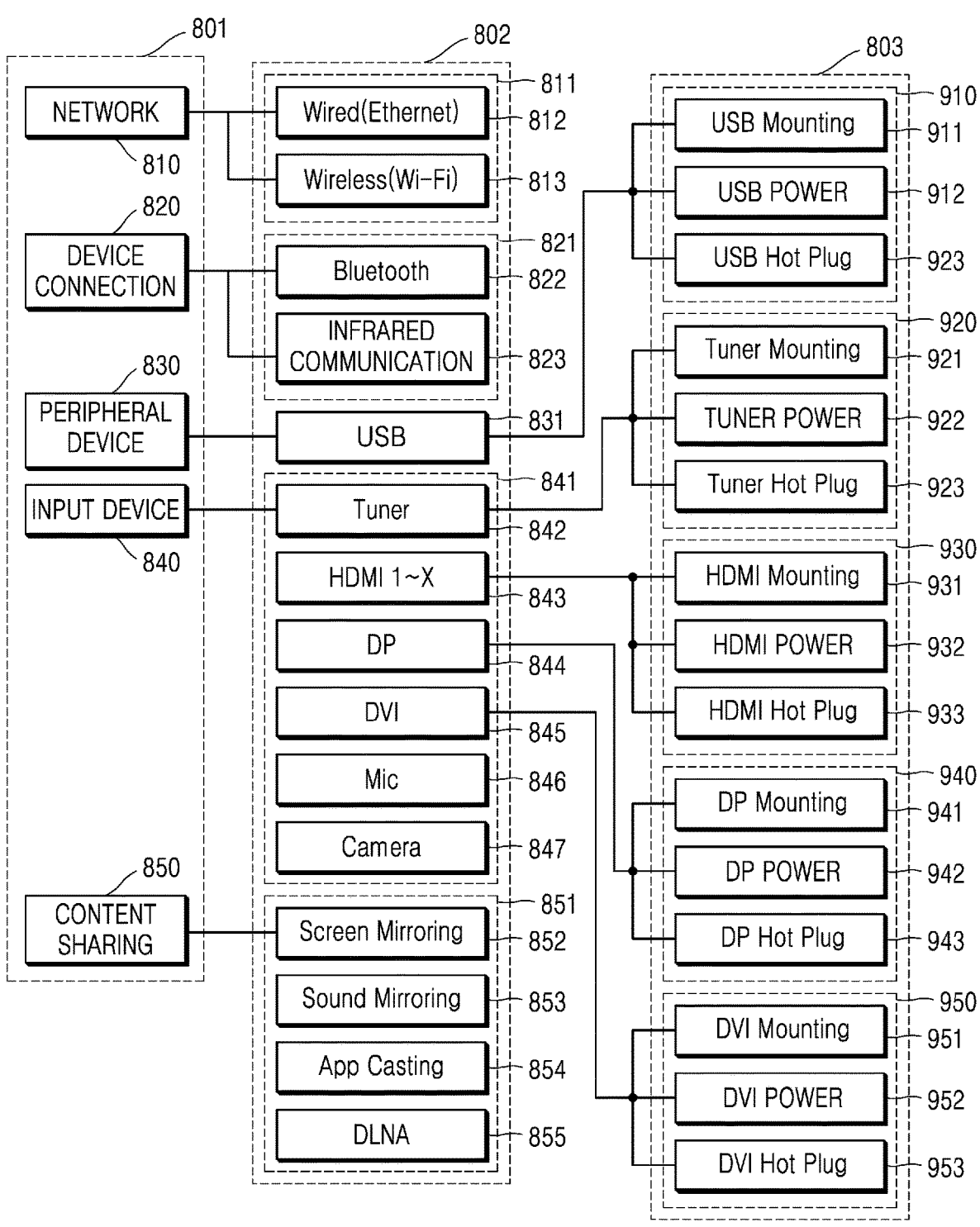
FIG. 10 is another diagram for describing support elements that may be provided by an electronic device, according to an embodiment of the disclosure.

FIG. 10 is another diagram for describing support elements that may be provided by an electronic device according to an embodiment of the disclosure. In FIG. 10, the same elements as those of FIGS. 8 and 9 are illustrated by using the same reference numerals. Therefore, the descriptions provided above with reference to FIGS. 8 and 9 are omitted.

Referring to FIG. 10, functions or services supported by the electronic device 500 may be hierarchically classified into the higher-level entities 801, the lower-level entities 802, and lowest-level entities 803.

FIGS. 8 to 10 illustrate an example in which support elements are hierarchically classified and listed in such a manner that, among functions supportable by the electronic device 500, the same or similar elements are classified as higher-level entities, and elements that are subordinate to the respective higher-level entities are classified as lower-level entities.

Figure 11:
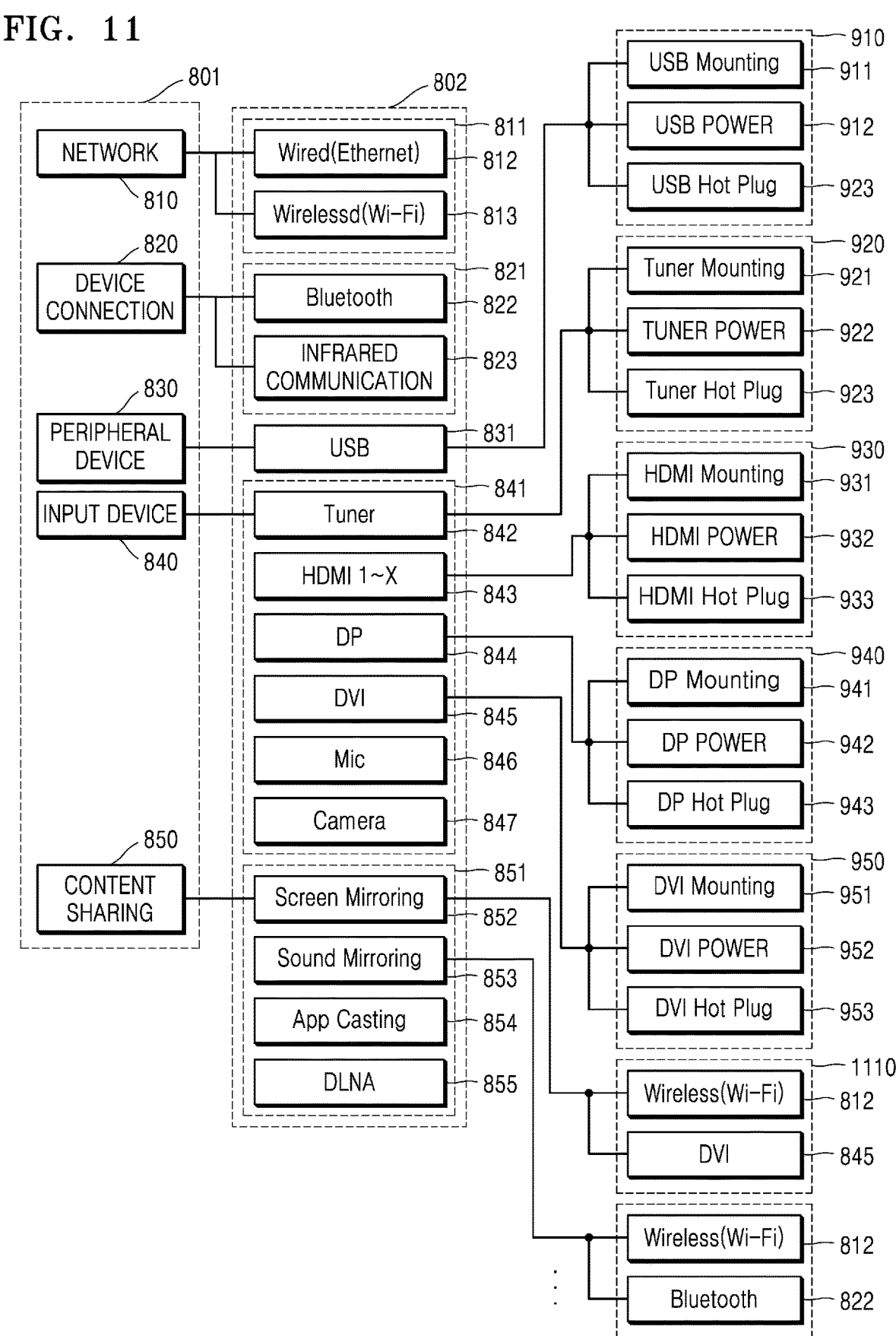
FIG. 11 is another diagram for describing support elements that may be provided by an electronic device, according to an embodiment of the disclosure.

FIG. 11 is another diagram for describing support elements that may be provided by an electronic device according to an embodiment of the disclosure. In FIG. 11, the same elements as those of FIGS. 8 to 10 are illustrated by using the same reference numerals. Therefore, the descriptions provided above with reference to FIGS. 8 to 10 are omitted.

Referring to FIG. 11, in addition to the components illustrated in FIG. 10, functional elements 1110 and functional elements 1121 may be additionally included.

For example, in the content sharing entities 850, HW resources required to implement the screen mirroring function 852 may be further subdivided, to classify the functional elements. For example, the screen mirroring function 852 may include at least one of a wired communication module or a wireless communication module, as a support element. For example, because the screen mirroring function 852 may be provided by using any one of a wired communication module or a wireless communication module, the wired communication module or the wireless communication module may be listed as lower-level support elements subordinate to the screen mirroring function 852. For example, in a case in which the screen mirroring function 852 is provided through Wi-Fi communication, Wi-Fi 812 may be listed as a lower-level support element of the screen mirroring function 852. As another example, in a case in which the screen mirroring function 852 is provided through a DVI interface, DVI 845 may be listed as a lower-level support element of the screen mirroring function 852.

As another example, in sharing of audio content, HW resources required to implement the sound mirroring function 853 may be further subdivided, to classify the functional elements. For example, the sound mirroring function 853 may include at least one of a wired communication module or a wireless communication module, as a support element. For example, because the sound mirroring function 853 may be provided by using any one of a wired communication module or a wireless communication module, the wired communication module or the wireless communication module may be listed as lower-level support elements subordinate to the sound mirroring function 853. For example, in a case in which the sound mirroring function 853 is provided through Wi-Fi communication, the Wi-Fi 812 may be listed as a lower-level support element of the sound mirroring function 853. As another example, in a case in which the sound mirroring function 853 is provided through Bluetooth communication, Bluetooth 822 may be listed as a lower-level support element of the sound mirroring function 853.

According to an embodiment of the disclosure, in identifying a history of use regarding a plurality of applications provided by the electronic device 500, a history of use regarding support elements corresponding to the applications may be considered in association with the history of use regarding the applications. For example, according to an embodiment of the disclosure, when the user has requested execution of a certain application in order to receive a certain service, and the application has been executed in response thereto, first information indicating which support element is used to execute the application or to support the execution of the application is obtained.

For example, the first information may include information about a history of use regarding at least one support element that supports execution of each of at least one application that may be provided by the electronic device. For example, 'information about a history of use' may include information about a time period of use, a time point of use, a frequency (or the number of times) of use, an interval of use, and the like.

For example, the first information may include information about at least one of frequencies of use or time periods of use of each of the at least one application and at least one support element corresponding thereto within a first period. Here, the first period may refer to a time period, or may refer to the number of times of use, a frequency of use, or the like.

Hereinafter, the first information is described in detail with reference to FIGS. 12 to 14.

FIG. 12 is a diagram for describing first information obtained in an embodiment of the disclosure.

In an embodiment of the disclosure, first information indicating a history of use regarding each of a plurality of applications provided by the electronic device 500 may be used.

For example, the first information may be information indicating a history of use regarding at least one support element corresponding to each application. For example, the first information may indicate a history of use indicating which support elements have been used and/or provided upon an application App1 being executed.

FIG. 12 shows an example of a history of use regarding the application App1 within a certain period. For example, the first information may include information 1200. FIG. 12 illustrates an example of information indicating a history of use corresponding to the first application App1 among a plurality of applications provided by the electronic device 500.

For example, the first information is information collected over time or during a time period, and may be expressed in the form of 'time-series data'. For example, a history of use may be collected during a preset time period. FIG. 12 illustrates an example in which the preset time period includes a total of 10 frequencies including Frequency 1 1221 to Frequency 10 1223, or a time period corresponding to Frequency 10.

For example, the frequencies may be expressed with respect to preset time periods, preset time points (e.g., with an interval of one hour or one day), a time period between a time point at which execution of an application is started, and a time point at which the execution is terminated, or the like. For example, Frequency 1 may be counted with respect to an interval of one hour. Alternatively, Frequency 1 or an event of the history of use may be counted with respect to a time period between a time point at which execution of the application is started, and a time point at which the execution is terminated.

A history of use regarding each of support elements that are used while the application App1 is executed may be included in the first information. The history of use regarding each of the support elements may be expressed with a value obtained by dividing a time period of use of the support element in Frequency 1 by the total time period of use in Frequency 1.

For example, Frequency 1 of the history of use regarding the application App1 may correspond to a time period between a time point at which execution of the application App1 is started, and a time point at which the execution is terminated. In the above example, suppose that the first event of the history of use regarding the application App1 indicates that the application App1 has been used for 100 minutes. Furthermore, suppose that the first event of the history of use regarding the application App1 indicates that Support element 1 has been used for 15 minutes. Then, the use of Support element 1 may be expressed as 0.15 (1231).

For example, support elements 1210 listed in the columns of the information 1200 included in the first information illustrated in FIG. 12 may be the higher-level entities 801 described above with reference to FIGS. 8 to 11, respectively. Alternatively, the support elements 1210 listed in the columns of the information 1200 may be the functions included in the lower-level entities 802 described above with reference to FIGS. 8 to 11, respectively. Alternatively, the support elements 1210 listed in the columns of the information 1200 may be the functions included in the lowest-level entities 803 described above with reference to FIGS. 8 to 11, respectively.

For example, the support elements 1210 listed in the columns of the information 1200 included in the first information may include only support elements that are used for execution of the application App1.

Alternatively, the support elements 1210 listed in the columns of the information 1200 may include all support elements corresponding to all functions that may be provided by the electronic device 500.

FIG. 13 is another diagram for describing first information obtained in an embodiment of the disclosure.

FIG. 13 shows an example of a history of use regarding an application App1 within a certain period. For example, the first information may include information 1300.

As described above with reference to FIGS. 12 and 13, the first information may include information 1200 and 1300 indicating a history of use related to support elements for each of the applications that may be provided by the electronic device 500.

FIG. 14 is another diagram for describing first information 1400 obtained in an embodiment of the disclosure.

The first information 1400 may be expressed in the form illustrated in FIG. 14. For example, the first information 1400 may include information indicating a history of use regarding support elements corresponding to each of applications App1 to AppN that may be provided by the electronic device 500.

For example, the first information may be collected for a preset time period prior to the current time point, a preset number of times of use, or a preset time period of use. For example, the first information may be information collected within one month prior to a time point at which the control command of operation S710 is received.

As another example, the first information may be updated at regular intervals. For example, the first information may be collected at weekly intervals, monthly intervals, or the like, and updated at such intervals.

As another example, the first information may be updated at intervals of a preset number of times of use. For example, the first information may be collected every 10 times, 20 times, etc. of the use of the application.

As another example, the first information may be accumulated and collected according to a request of the user, and may be updated according to a request of the user.

In an embodiment of the disclosure, the second information may be information output from a machine learning model that predicts a probability of use of applications and support elements, based on the first information.

Hereinafter, the above-described second information and machine learning model is described in detail with reference to FIGS. 15 to 20.

Machine learning is a technology for analyzing data through computational operations and outputting meaningful results. For example, machine learning may be a technology for allowing a machine to learn data based on AI and derive an intended result.

An AI system is a computer system that implements human-level intelligence, and allows a machine to learn by itself, make decisions, and become smarter, unlike an existing rule-based smart system. As the AI system is more frequently used, the recognition rate of the AI system is improved and accurately understands a user's preference, and accordingly, the existing rule-based smart systems have gradually been replaced with deep-learning-based AI systems.

The AI technology includes machine learning (deep learning) and element technologies utilizing machine learning. The machine learning is an algorithm technology that classifies/learns features of input data by itself, and the element technologies are technologies that utilize machine learning algorithms such as deep learning, and may cover technical fields, such as linguistic understanding, visual understanding, inference/prediction, knowledge representation, or operation control.

In an embodiment of the disclosure, the machine learning technology for implementing inference/prediction included in the AI technology may be used. Inference/prediction may refer to technology for judging information for logical inference and prediction, and includes knowledge/probability-based reasoning, optimization prediction, preference-based planning, recommendation, or the like.

AI-related functions may be executed through the processor 210 and the memory 215. The processor 210 may include one or more processors. In this case, the one or more processors may be a general-purpose processor, such as a central processing unit (CPU), an application processor (AP), or a digital signal processor (DSP), a dedicated graphics processor, such as a GPU or a vision processing unit (VPU), or a dedicated AI processor, such as a neural processing unit (NPU). The one or more processors perform control to process input data according to predefined operation rules or an AI model stored in the memory. Alternatively, in a case in which the one or more processors are dedicated AI processors, the dedicated AI processor may be designed with a hardware structure specialized for processing a particular AI model.

In an embodiment of the disclosure, the above-described machine learning model may be a machine learning model that is trained to predict a pattern of use regarding the electronic device 200 based on a history of use regarding an application and at least one support element corresponding to the application. For example, the pattern of use regarding the electronic device 200 may refer to a probability that an application and at least one support element corresponding to the application are used to be in the best correspondence to an intention of a legal user or a legitimate user of the electronic device 200.

For example, the machine learning model may be generated through a training process for allowing the machine learning model to learn the first information. Here, being generated through a training process may mean that an operation rule or an AI model configured to perform desired characteristics (or purposes) is generated by training a basic AI model by using a learning algorithm that utilizes a large amount of training data.

Such a training process may be performed by the electronic device 500, or by a server and/or system physically separated from the electronic device 500. Examples of learning algorithms may include, for example, and without limitation, supervised learning, unsupervised learning, semi-supervised learning, reinforcement learning, or the like, but are not limited thereto.

The machine learning model used in an embodiment of the disclosure may be a machine learning model trained to predict a probability of use of an application and support elements based on first information.

For example, the machine learning model may be a machine learning model trained to predict a probability of use, based on a plurality of pieces of training data obtained by applying time windows to first information, which is time-series data. For example, the machine learning model may be a machine learning model trained to receive the plurality of pieces of training data obtained by applying the time windows to the first information, which is time-series data, and predict the probability of use based on the plurality of pieces of training data.

Figure 15:
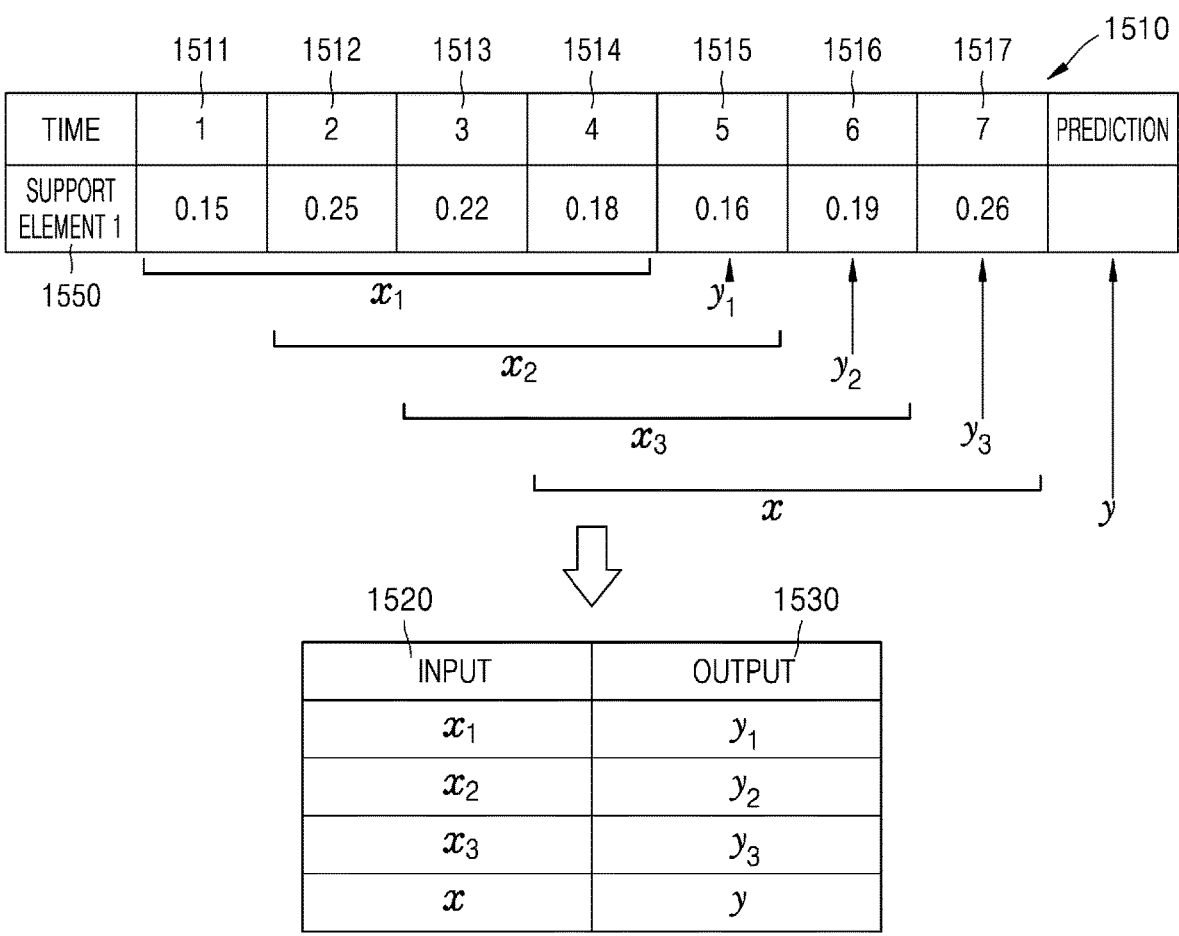
FIG. 15 is a diagram for describing an operation of training a machine learning model used in an embodiment of the disclosure.

In order to predict a probability of use of the first application and support elements related to the first application, the machine learning model may first learn a history of use regarding the first application and the support elements. Referring to FIG. 15, information 1510 is information indicating a history of use regarding the first application, and may be included in the first information. FIG. 15 illustrates an example in which only one support element is used for execution of the first application.

The information 1510 indicating the history of use regarding the first application is time-series data collected over time (or according to frequency over time), and may be expressed as illustrated in FIG. 15.

Training of the machine learning model may be performed by using a plurality of pieces of training data obtained by applying time windows to the first information.

For example, the time windows may enable extraction of data corresponding to a set time period or a set frequency. For example, a time window may be set to cover a number of times of use (or frequency of use) of 4. A first time window may extract data corresponding to numbers of times of use of 1 to 4, and a second time window may extract data corresponding to numbers of times of use of 2 to 5 with a shift of 1 from the coverage of the first time window. In addition, a third time window may extract data corresponding to numbers of times of use of 3 to 6 with a shift of 1 from the coverage of the second time window.

For example, in a case in which the machine learning model is trained based on supervised learning, the machine learning model may receive, as an input value 1520, data x1 corresponding to numbers of times of use of 1 to 4 and thus corresponding to the first time window, and receive, as an output value 1530 corresponding to the input value 1520, y1 (i.e., a data value corresponding to a number of times of use of 5). Then, the machine learning model may be trained to derive the output value y1 from the input data x1. Next, the machine learning model may receive data x2 corresponding to numbers of times of use of 2 to 5 and thus corresponding to the second time window, and receive, as an output value corresponding thereto, y2 (i.e., a data value corresponding to a number of times of use of 6). Then, the machine learning model may be trained to derive the output value y2 from the input data x2. Next, the machine learning model may receive data x3 corresponding to numbers of times of use of 3 to 6 and thus corresponding to the third time window, and receive, as an output value corresponding thereto, y3 (i.e., a data value corresponding to a number of times of use of 7). Then, the machine learning model may be trained to derive the output value y3 from the input data x3.

For example, the machine learning model may learn how to express, upon a certain history of use at a certain time point, the history of use after the time point.

The machine learning model that has been trained in the above manner may be referred to as a 'trained machine learning model'.

The machine learning model may output, based on the first information, information indicating a probability of use of a certain application and support elements related thereto at the current time point (e.g., a time point at which a control command is input, or a time point close to the time point at which the control command is input). For example, the 'probability of use' described above with reference to operation S720 may be expressed as a predicted value 'y'. The trained machine learning model may receive input data corresponding to a time window corresponding to the current time point (e.g., data x corresponding to numbers of times of use of 4 to 7), process the input data, and thus output, as an output value y, a probability of use of the support elements related to the application, i.e., an intended value. Here, the value of y may be included in the second information obtained in operation S720. The value of y may include information indicating a probability of use of the application and the support elements corresponding to the control command received in operation S710.

Figure 16:
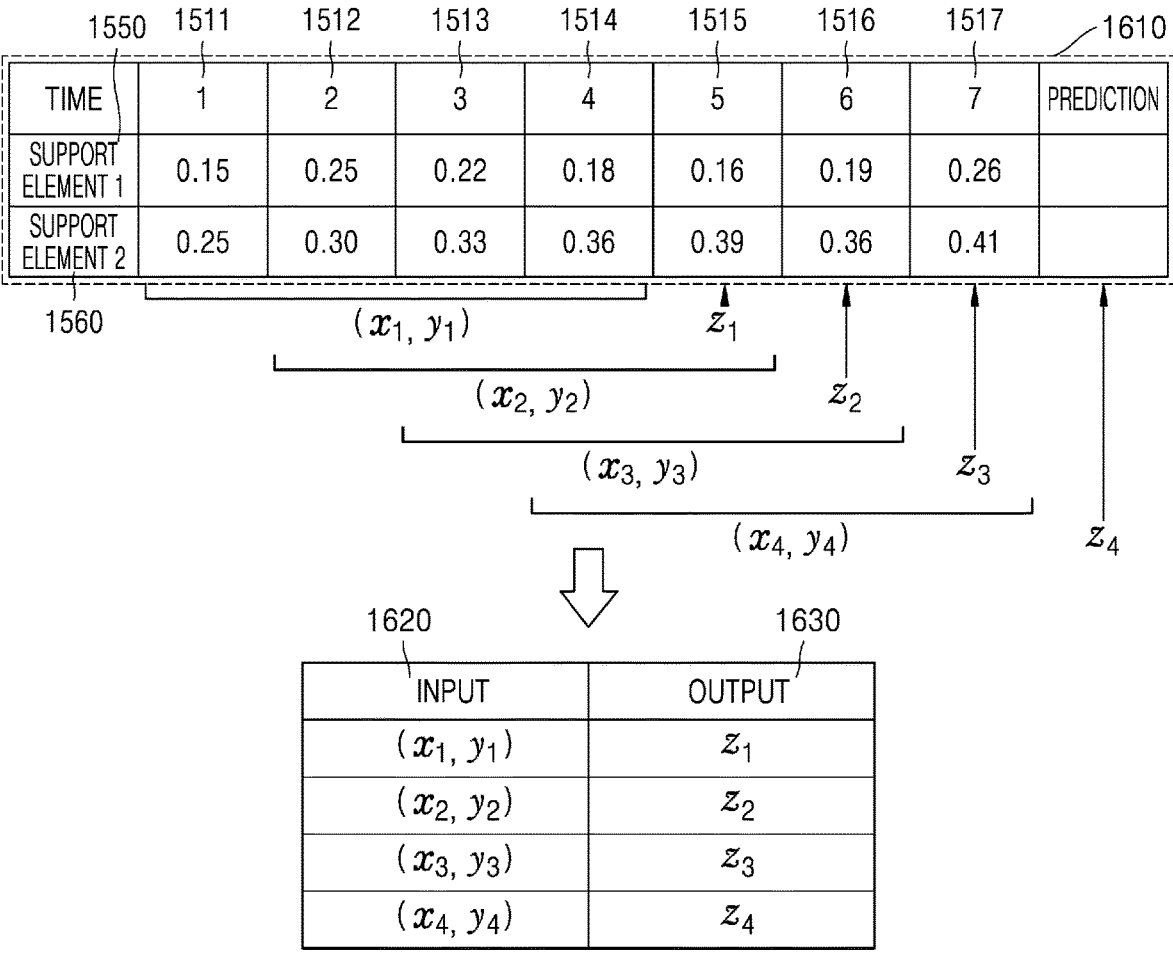
FIG. 16 is another diagram for describing an operation of training a machine learning model used in an embodiment of the disclosure.

FIG. 16 is another diagram for describing an operation of training a machine learning model used in an embodiment of the disclosure.

Referring to FIG. 16, information 1610 is information indicating a history of use regarding a first application, and may be included in first information. The information 1610 may further include a history of use regarding Support element 2, in addition to the information 1510 illustrated in FIG. 15. FIG. 16 illustrates an example in which Support element 1 and Support element 2 are used for execution of the first application. Time windows applied to the information 1610 and a machine learning model trained by using the information 1610 are the same as those described above with reference to FIG. 15, and thus, redundant descriptions thereof are omitted.

In a case in which a plurality of support elements are used or supported in response to execution of the application, an input value 1620 to be input for training the machine learning model may be expressed as a multidimensional value. For example, as illustrated in FIG. 16, a value corresponding to Support element 1 may be expressed as x, and a value corresponding to Support element 2 may be expressed as y. Also, the input value 1620 may be expressed as a vector corresponding to the multidimensional value.

The machine learning model may be trained to predict an output value 1630 corresponding to the input value 1620.

As described above with reference to FIGS. 15 and 16, operation S720 illustrated in FIG. 7 may include inputting, to the trained machine learning model, data included in the time window set on the first information corresponding to the time point at which the command of operation S710 is received, and obtaining, as the second information, output data output from the trained machine learning model in response to the input of the data.

The machine learning model may be loaded or stored in the electronic device 100, 200, 300, 400, 500 or 600 according to an embodiment of the disclosure. In a case in which the machine learning model is loaded in the electronic device 100, 200, 300, 400, 500 or 600, the machine learning model may be referred to as an on-device model.

For example, at least one of the processor 210 or the memory 215 may store the machine learning model. The machine learning model stored in at least one of the processor 210 or the memory 215 may be a trained machine learning model. For example, the processor 210 may perform control such that first information is obtained and then an operation of training the machine learning model based on the obtained first information.

The processor 210 may input, to the trained machine learning model stored therein, at least partial data included in the first information, and obtain, as second information, an output value corresponding to the partial data.

As another example, the machine learning model may not be stored in the electronic device 500. In this case, the processor 210 may control the communication interface 230 to request that the second information be output from the machine learning model stored in an external device, and receive the second information transmitted from the external device, in response to the request. An embodiment of the disclosure in which the machine learning model is stored in an external device is described below with reference to FIGS. 25 to 28.

In an embodiment of the disclosure, a tree-based algorithm that performs computations to predict output data based on input data, a boosting algorithm that performs continuous training and, when an error occurs, performs training again by taking into account the error (e.g., performing training by adjusting weights corresponding to a part in which the error occurs), and the like may be used for the machine learning model.

For example, the machine learning model may include at least one of a decision tree algorithm, a random forest algorithm, a gradient boosting machine (GBM) algorithm, an extreme gradient boosting (XGBoost) algorithm, an adaptive boosting (AdaBoost) algorithm, a light GBM algorithm, or a CatBoost (Category+Boosting) algorithm. Here, the random forest algorithm is an example of a tree-based algorithm. In addition, the XGBoost algorithm is an example of a boosting algorithm.

For example, the machine learning model may be an ensemble model that includes at least two of a decision tree algorithm, a random forest algorithm, a GBM algorithm, an XGBoost algorithm, an AdaBoost algorithm, a light GBM algorithm, or a CatBoost algorithm, which are connected to each other in parallel, and outputs final output data based on an output of each of the at least two models connected to each other in parallel.

FIG. 17 is a diagram for describing a machine learning model used in an embodiment of the disclosure.

FIG. 17 illustrates an example in which an XGBoost model is used as the machine learning model.

An XGBoost model 1720 is a scalable tree boosting system, and may be an implementation model that activates optimized GBM. In detail, the XGBoost model is a model generated by adding a regularization term to prevent overfitting, which is an issue in GBM. The XGBoost model is able to find the most accurate split to predict a desired result from a decision tree, and thus may have high output accuracy.

Referring to FIG. 17, information 1710 indicating a history of use regarding one application among first information may be input to the machine learning model 1720, and then an output value 1730 indicating a probability of use of functional elements Func a, Func b, Func c, and Func d corresponding to the application may be output in response to the input information 1710. Here, the output value 1730 may be information indicating a probability of use included in second information.

FIG. 18 is another diagram for describing a machine learning model used in an embodiment of the disclosure.

FIG. 18 illustrates an example in which a random forest model is used as the machine learning model. In FIG. 18, the same elements as those of FIG. 17 are illustrated by using the same reference numerals.

A random forest model 1820 is a machine learning model used for scalable classification and regression analysis, and may operate to output a classification or average prediction from a plurality of decision trees. The random forest model 1820 has advantages in that it is easy to process a large amount of data and is able to prevent overfitting issues.

Referring to FIG. 18, the information 1710 indicating the history of use regarding one application among first information may be input to the machine learning model 1820, and then an output value 1830 indicating a probability of use of the functional elements Func a, Func b, Func c, and Func d corresponding to the application may be output in response to the input information 1710. Here, the output value 1830 may be information indicating a probability of use included in second information.

Although an example in which the input data input to the machine learning model is information indicating a history of use regarding one application is described with reference to FIGS. 17 and 18, first information indicating a history of use regarding each of the plurality of applications that may be provided by the electronic device 500 may be sequentially or simultaneously input, and then second information corresponding to the plurality of applications may be obtained.

Figure 19:
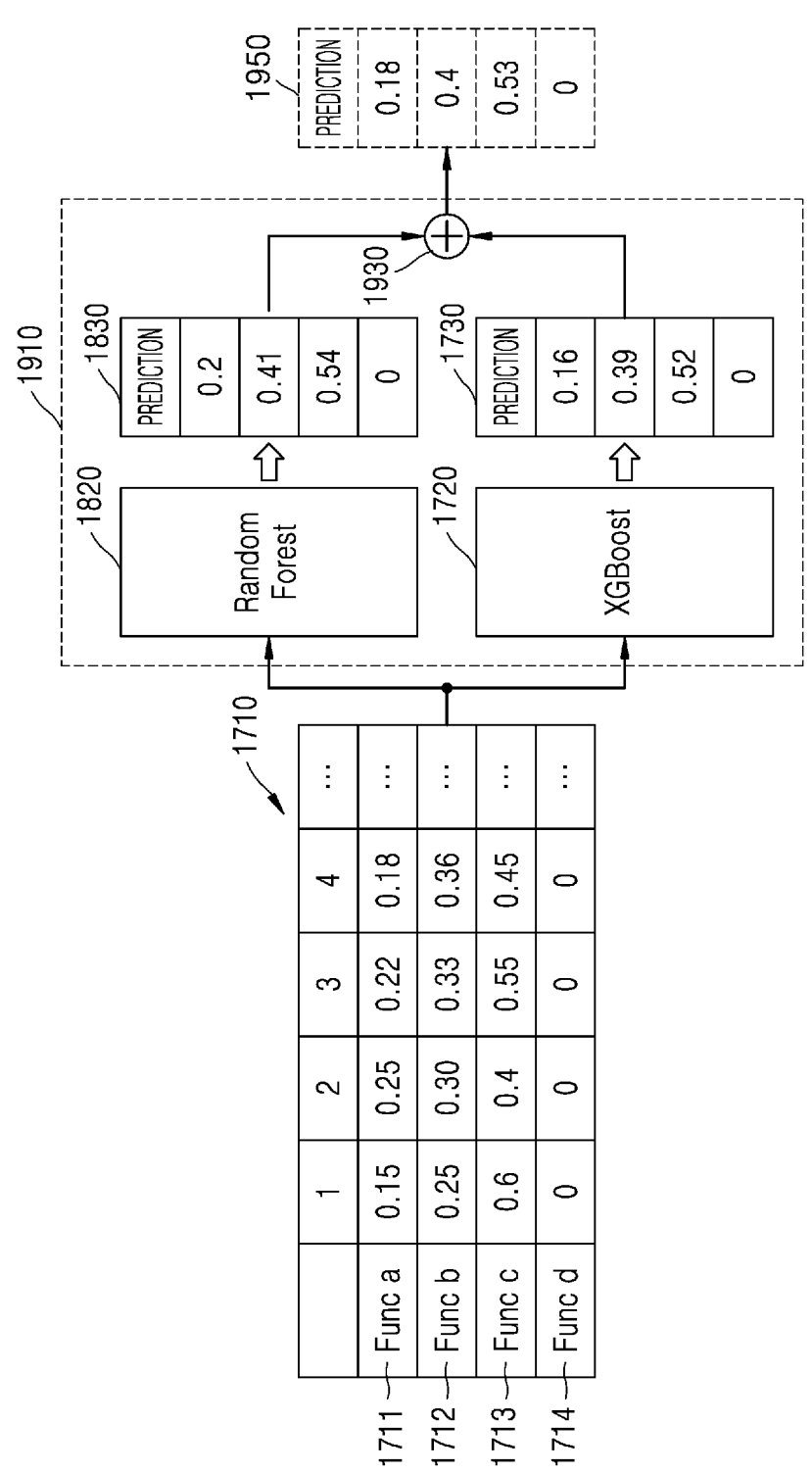
FIG. 19 is another diagram for describing a machine learning model used in an embodiment of the disclosure.

FIG. 19 is another diagram for describing a machine learning model used in an embodiment of the disclosure. In FIG. 19, the same elements as those of FIGS. 17 and 18 are illustrated by using the same reference numerals.

Referring to FIG. 19, a machine learning model 1910 may be generated as an ensemble model in which a plurality of machine learning models are combined with each other. For example, the machine learning model may be an ensemble model that includes at least two of a decision tree algorithm, a random forest algorithm, a GBM algorithm, an XGBoost algorithm, an AdaBoost algorithm, a light GBM algorithm, or a CatBoost algorithm, which are connected to each other in parallel, and outputs final output data based on an output of each of the at least two models connected to each other in parallel.

FIG. 19 illustrates an example in which the machine learning model 1910 is an ensemble model in which the XGBoost model 1720 and the Random Forest model 1820 are connected to each other in parallel.

Referring to FIG. 19, each of the XGBoost model 1720 and the Random Forest model 1820 included in the machine learning model 1910 may receive the information 1710 included in the first information, and output a output value corresponding to the information 1710.

In addition, the machine learning model 1910 may perform weighted average processing 1930 on each of the XGBoost model 1720 and the random forest model 1820 to output a final result value 1950.

As described above, when the ensemble model is used, the variance of result values may be reduced compared to a single machine learning model. Accordingly, the accuracy and/or reliability of the results may be increased.

In addition, different weights may be applied to the XGBoost model 1720 and the random forest model 1820 included in the machine learning model 1910 to output a final result value.

FIG. 20 is a diagram for describing second information obtained in an embodiment of the disclosure.

FIG. 20 illustrates information 2000 about a probability of use of at least one support element corresponding to each of applications, which is output through the machine learning model 1720, 1820 or 1910 described above with reference to FIGS. 17 to 19. For example, the information 2000 may be second information.

In an embodiment of the disclosure, the processor 210 may obtain in advance and then use the second information. Alternatively, the processor 210 may obtain the second information based on the control request of operation S710 being received.

Referring back to FIG. 7, the processor 210 may automatically control execution of the control command received in operation S710, based on the second information obtained in operation S720 (S730).

When the processor 210 perform control such that the control command is executed based on the second information, the processor 210 may permit use of at least one support element corresponding to execution of the application requested by the control command. Accordingly, the corresponding application may be executed by using the at least one support element.

When the processor 210 perform control such that the control command is not executed based on the second information, the processor 210 may perform control the at least one support element corresponding to execution of the application requested by the control command not to be used (or supported). For example, when the processor 210 perform control such that the control command is not executed based on the second information, the processor 210 may block or disable the at least one support element corresponding to execution of the application requested by the control command. For example, blocking of support elements may be hierarchically performed. For example, hierarchical blocking of a support element may refer to adjusting the extent of blocking, such as fundamentally blocking a connection to the support element, blocking the support element such that a connection to the support element is permitted but transmission and reception of data through the support element are not permitted, or blocking the support element such that a connection to the support element and transmission and reception of data through the support element are permitted but output of transmitted or received data is not permitted.

For example, a lecture application may be installed in an electronic device. When the lecture application is executed, lecture video content may be received from an external device or an external server connected to the electronic device through Ethernet, and then the received lecture video content may be reproduced.

Referring to FIG. 7 and the above-described examples, a first application may be a 'lecture application', and a support element used for execution of the first application may be an 'Ethernet module' (e.g., the wired communication module (e.g., an Ethernet module) 812 illustrated in FIG. 8).

Suppose that the 'command for requesting control' described above with reference to operation S710 is a command to execute the first application (e.g., the lecture application) through the Ethernet module. In addition, the first information may be about the Ethernet module 812, which is a support element required for execution of the first application (e.g., the lecture application).

The machine learning model used in an embodiment of the disclosure may be trained based on the first information indicating the history of use regarding the first application provided by the electronic device, and then output a probability of use of the support element corresponding to the first application.

For example, in an embodiment of the disclosure, in a case in which the second information output by the machine learning model indicates that the probability of use of the Ethernet module, which is a support element used for execution of the first application, is low, it may be recognized that the user of the electronic device 500 is highly likely to intend not to use the corresponding function, and, even when a control command that is a command to execute the first application (e.g., the lecture application) is received through the Ethernet module, an operation corresponding to the control command may not be performed. For example, a communication connection through the Ethernet module may be rejected. Alternatively, even when a communication connection is established through the Ethernet module, blocking may be performed such that the lecture content is not received.

As another example, in an embodiment of the disclosure, in a case in which the second information output by the machine learning model indicates that the probability of use of the Ethernet module, which is a support element used for execution of the first application, is high, it may be recognized that the user of the electronic device 500 is highly likely to intend to use the corresponding function, and, when a control command that is a command to execute the first application (e.g., the lecture application) is received through the Ethernet module, an operation corresponding to the control command may be performed.

As described above, in an embodiment of the disclosure, an application is associated with at least one support element corresponding thereto to collect first information indicating a history of use regarding the application and the at least one support element is collected, and a trained machine learning model is used to output second information including a probability of use of the application and the at least one support element, based on the first information. Accordingly, based on the information (specifically, the above-described second information) including the probability of use of the application in the electronic device and the at least one support element corresponding thereto, the received control command may be executed or execution of at least one of operations corresponding thereto may be rejected, to be in further correspondence to an intention of the user.

Thus, it is possible to flexibly use or control support elements in correspondence to the intention of the user, even without complicated settings or selective blocking settings in units of support elements. Therefore, it is possible to increase the user's manipulation convenience and ease of management.

Figure 21A:
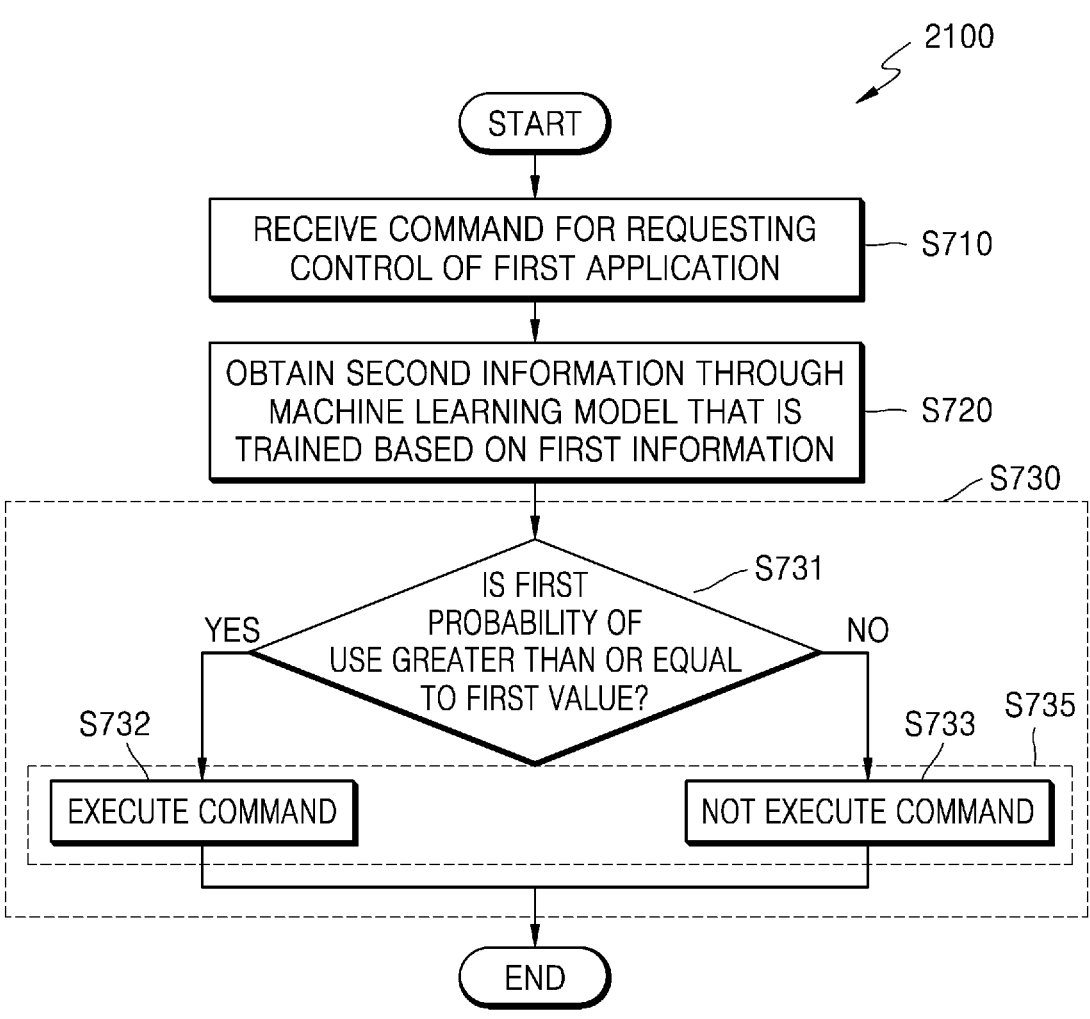
FIG. 21A is another flowchart illustrating an operating method of an electronic device, according to an embodiment of the disclosure.

FIG. 21A is another flowchart illustrating an operating method 2100 of an electronic device according to an embodiment of the disclosure. The operating method 2100 of the electronic device illustrated in FIG. 21A may correspond to operations performed by the electronic device 100, 200, 300, 400, 500 or 600 according to an embodiment of the disclosure described above with reference to FIGS. 1 to 6. In addition, in the operating method 2100 of the electronic device illustrated in FIG. 21A, the same components as those of the operating method 700 of the electronic device illustrated in FIG. 7 are illustrated by using the same reference numerals. Therefore, descriptions provided above with reference to the operating method 700 of the electronic device are omitted.

Hereinafter, for convenience of description, an example is described in which the operations included in the operating method 2100 of the electronic device are performed by the electronic device 500 described above with reference to FIG. 5.

Referring to FIG. 21A, the operating method 2100 of the electronic device may include, after operation S720, comparing the first probability of use with a first value (S731). Operation S731 may be performed by the processor 210.

For example, the processor 210 may determine whether the first probability of use is greater than or equal to the first value (S731). Alternatively, the processor 210 may determine whether the first probability of use is greater than the first value (S731).

For example, the control command received in operation S710 may be a command for requesting control of the first application App1 among the plurality of applications that may be provided by the electronic device 500. For example, the first probability of use may be a value corresponding to a value output from the machine learning model trained based on the first information including the information 1200 indicating the history of use corresponding to the first application illustrated in FIG. 12. Referring back to the information 2000 illustrated in FIG. 20, the first probability of use may be a value indicating the probability of use of at least one support element corresponding to the first application App1 included in the information 2000. Referring to the information 2000, the first probability of use may be expressed as 'the probability of use of Support element 1 is 0.2, the probability of use of Support element 2 is 0.4, and the probability of use of Support element 3 is 0.5 during execution of the first application'.

For example, the first value may be a set value. For example, the first value may be a preset value. In detail, the first value may be a value optimized and preset by the processor 210. Alternatively, the first value may be a value preset by the user.

For example, the first value may refer to a reference value for determining whether the support element is used. For example, when the support element is likely to be used for a significantly short time period or at long intervals, it is difficult to say that the support element is used for execution of the application. Accordingly, the first value may be optimized and set to a value for determining whether the support element corresponding to the application is used.

For example, the first value may be set to a value optimized through repeated experiments.

For example, in response to the information 2000 illustrated in FIG. 20, the first value may be set to a value such as 0.1.

In addition, the 'first value' is not a value indicating a value of a particular order or a particular rank, but may refer to a value indicating the above-described reference value or set value.

Based on a result of the comparing of operation S731, a function corresponding to the command received in operation S710 may be executed (S735). For example, based on the result of the comparing of operation S731, execution of the command received in operation S710 may be controlled (S735). Operation S731 may be performed by the processor 210. For example, 'executing of a command' may refer to 'executing a function corresponding to the command'.

For example, when the first probability of use is greater than or equal to (or is greater than) the first value, the processor 210 may execute the command for requesting control of the first application (e.g., the control command received in operation S710) to control operations corresponding to the command to be performed (S732).

In addition, operation S732 may further include outputting a notification message notifying of execution of the command (operation not shown).

For example, the notification message may include a message stating, "Your request is being executed", "Executing your request", "Your request is being executed. Please wait", or "Your request is being executed/Activated module: xxx". The message may be a visual or audible message.

For example, the notification message may be visually output on the display 220. For example, the processor 210 may control the notification message to be output on at least a partial region of the display 220.

As another example, the notification message may be output as an audible message under control by the processor 210. For example, the processor 210 may perform control such that audio data corresponding to the notification message is generated and then output through the audio output unit 250 of the electronic device 500, and thus the notification message is delivered to the user as an audible message. Alternatively, in order for the notification message to be delivered as an audible message to the user through another electronic device (specifically, capable of communicating with the electronic device 500) being used by the user, the processor 210 may perform control such that audio data corresponding to the notification message is generated, and control the communication unit 232 to transmit the generated audio data to the other electronic device. Accordingly, the other electronic device may provide the user with an audio corresponding to the notification message.

The output notification message is described in detail below with reference to FIGS. 21B and 21C. Hereinafter, an example in which the notification message is output as a visual message is described with reference to FIGS. 21B and 21C.

In addition, in a case in which the electronic device 500 includes the display 220, the notification message may be output through the display 220.

Alternatively, in a case in which the electronic device according to an embodiment of the disclosure does not include a display as in the electronic device 200 or 400 illustrated in FIG. 2 or 4, the processor 210 may perform control such that the notification message is output through the external display 410 that outputs image data provided by the electronic device 200. In this case, the processor 210 may generate image data including the notification message, and control the communication unit 232 to transmit the generated image data to the external display 410.

Figure 21B:
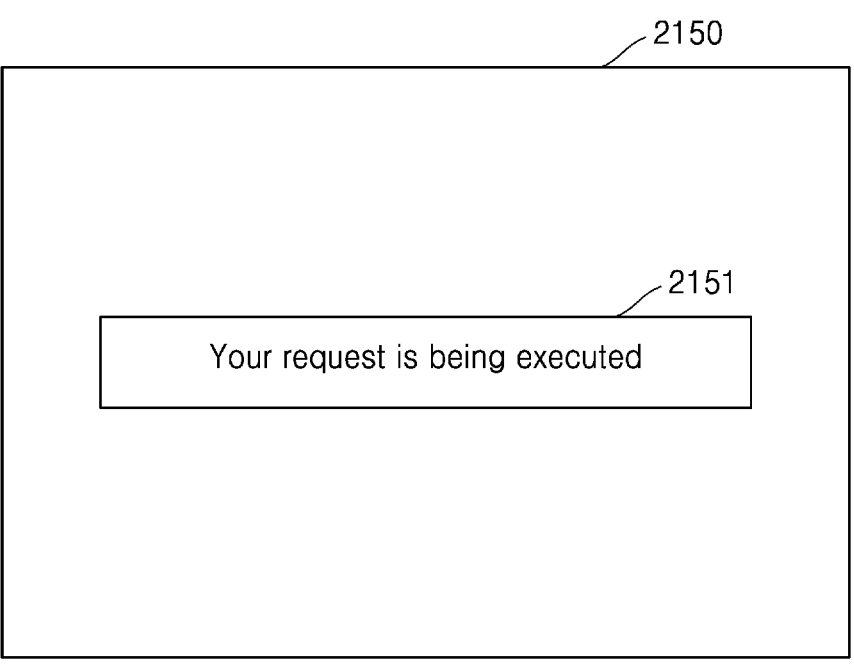
FIG. 21B is a diagram for describing an operation of the operating method of the electronic device illustrated in FIG. 21A.

FIG. 21B is a diagram for describing an operation of the operating method 2100 of the electronic device illustrated in FIG. 21A.

Figure 21C:
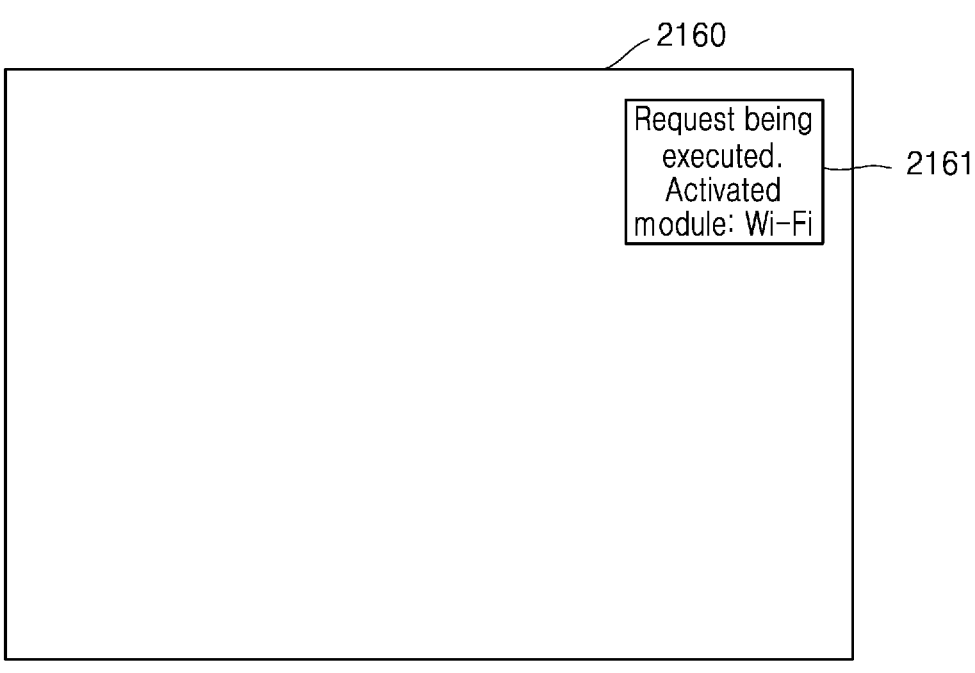
FIG. 21C is another diagram for describing an operation of the operating method of the electronic device illustrated in FIG. 21A.

FIG. 21C is another diagram for describing an operation of the operating method 2100 of the electronic device illustrated in FIG. 21A.

As illustrated in FIG. 21B, a notification message 2151 may be displayed on a screen 2150 output from the electronic device 500.

As illustrated in FIG. 21C, a notification message 2161 may be displayed on a screen 2160 output from the electronic device 500. For example, the notification message 2161 may include information about at least one support element corresponding to an application executed upon execution of a command, i.e., an activated support element. For example, when a certain application is executed according to execution of a request and a Wi-Fi module is activated to support the execution of the application, information, such as 'Activated module: Wi-Fi', may be included in the notification message 2161.

For example, because the machine learning model has learned the pattern of use regarding the support element corresponding to the application based on the first information, that the first probability of use included in the second information output from the machine learning model is greater than or equal to the first value may mean that the user is likely to use the first support element corresponding to the first application. Accordingly, when the first probability of use is greater than or equal to the first value, executing the received control command as it is may be in correspondence to the intention of the user. Therefore, the first control command may be automatically executed in correspondence to the intention of the user.

For example, when the first probability of use is less than (or is less than or equal to) the first value, the processor 210 may not execute the command for requesting control of the first application (e.g., the control command received in operation S710) (S733).

For example, because the machine learning model has learned the pattern of use regarding the support element corresponding to the application based on the first information, that the first probability of use included in the second information output from the machine learning model is less than the first value may mean that the user is unlikely or less likely to use the first support element corresponding to the first application. Accordingly, when the first probability of use is less than the first value, not executing the received control command may be in correspondence to the intention of the user. Therefore, the first control command may be ignored in correspondence to the intention of the user.

In addition, operation S733 may further include outputting a notification message notifying that the command is not executed (operation not shown).

For example, the notification message may include a message stating, "Your request will not be executed", "Request not executed", "The function is blocked", or "You have requested a disabled function. If you want to use it, please enable it in settings". The notification message may be a visual or audible message. The configuration of visually or audibly outputting the notification message is the same as the configuration of outputting the notification message described above with reference to operation S732, and thus, detailed descriptions thereof are omitted.

Figure 22A:
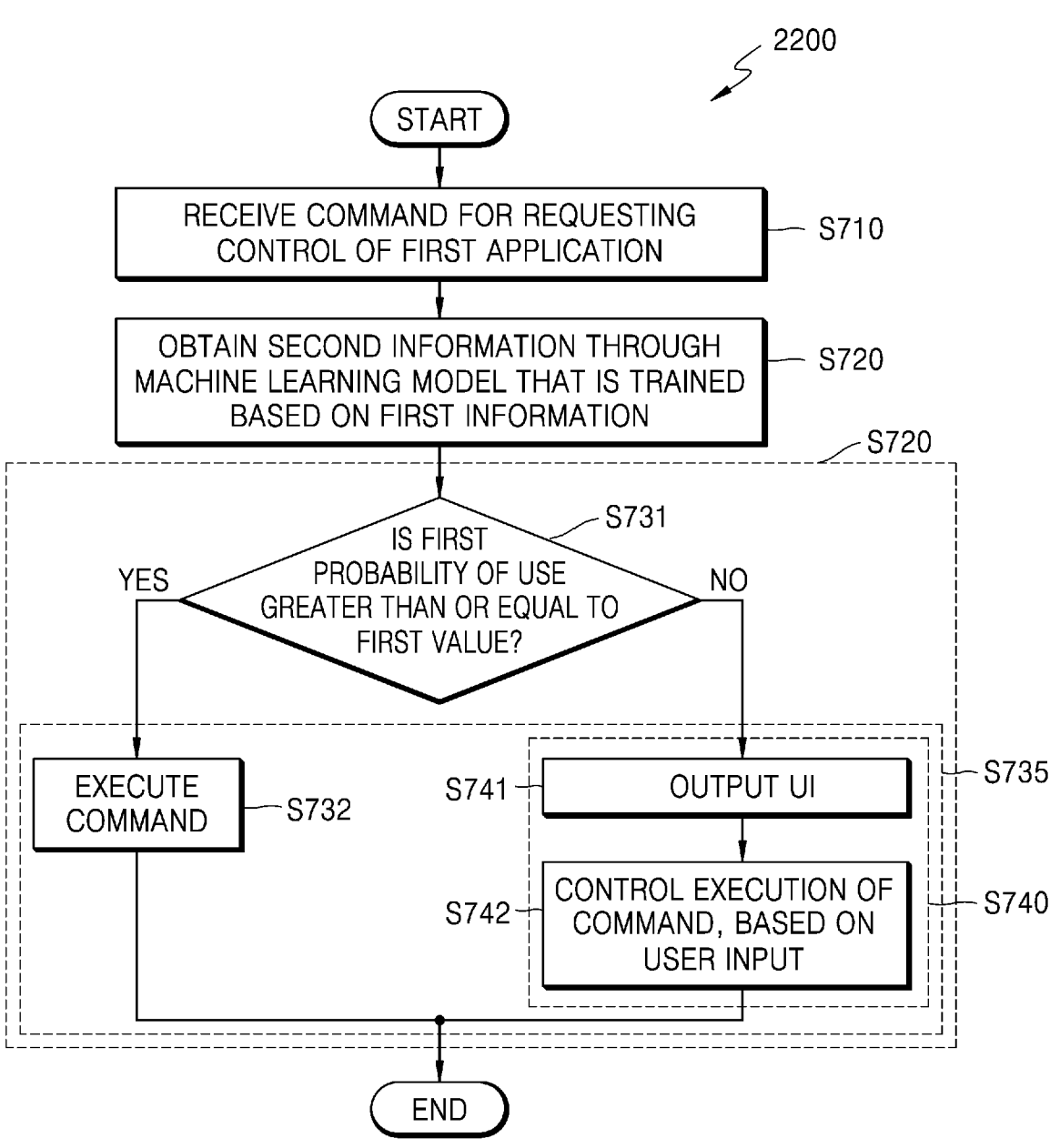
FIG. 22A is another flowchart illustrating an operating method of an electronic device, according to an embodiment of the disclosure.

FIG. 22A is another flowchart illustrating an operating method 2200 of an electronic device according to an embodiment of the disclosure. The operating method 2200 of the electronic device illustrated in FIG. 22A may correspond to operations performed by the electronic device 100, 200, 300, 400, 500 or 600 according to an embodiment of the disclosure described above with reference to FIGS. 1 to 6. In addition, in the operating method 2200 of the electronic device illustrated in FIG. 22A, the same components as those of the operating methods 700 and 2100 of the electronic device illustrated in FIGS. 7 and 21A are illustrated by using the same reference numerals. Therefore, descriptions provided above with reference to the operating method 700 of the electronic device are omitted.

Hereinafter, for convenience of description, an example is described in which the operations included in the operating method 2200 of the electronic device are performed by the electronic device 500 described above with reference to FIG. 5.

Referring to FIG. 22A, when the first probability of use is less than (or less than or equal to) the first value, the operating method 2200 of the electronic device may proceed to operation S740. Operation S740 may be performed by the processor 210.

For example, based on the first probability of use being less than (or less than or equal to) the first value, the processor 210 may provide a first UI screen for confirming user information registered in the electronic device 500 (S741). Operation S741 may be performed by the display 220 under control by the processor 210. Alternatively, in order for the first UI screen to be output on the external display 410 described above with reference to FIG. 4, the processor 210 may control the communication interface 230 to transmit image data corresponding to the first UI screen to the external display 410.

For example, the user information may be information for identifying a user having a control or management right, a legitimate use right, or a preferential use right with respect to the electronic device 500. For example, the user information may be information about the above-described registered user.

For example, the registered user may be a user having a right to use, manipulate, or manage the electronic device 500. For example, the electronic device may be a digital TV installed in a classroom of a school. In this case, the digital TV is an electronic device installed for the purpose of education in a school class, and the teacher of the class may have a right to manage the digital TV. Accordingly, the registered user may be the teacher, and the teacher may initially set or initially register user information in the electronic device 500 in order to restrict or manage the use of the digital TV.

As another example, in a case in which the electronic device is a digital TV, due to a characteristic that multiple people may use the digital TV, there may be a plurality of users, in addition to users having legitimate or preferential rights. Examples of the users having the legitimate or preferential rights include owners of the digital TV, family members in the house in which the digital TV is located, and the like. A registered user of the electronic device 500 may have a preferential use right.

As described above, in order to identify a registered user of the electronic device, the electronic device may receive an input or a configuration of user information from the registered user once at first or at a set period.

For example, the user information may include at least one of personal identification number (PIN) information, an identifier (ID), an initially set password, a pattern, or user biometric information.

The UI screen output in operation S741 is for confirming whether the control command received in operation S710 is requested by the registered user, and may include a message stating, for example, 'Please enter your PIN', 'You need to enter your PIN to execute the command', 'Enter your PIN', or the like.

Also, the message may be output as an audio message.

In addition, in a case in which the electronic device 500 includes the display 220, the UI output in operation S741 may be output through the display 220.

Alternatively, in a case in which the electronic device according to an embodiment of the disclosure does not include a display as in the electronic device 200 or 400 illustrated in FIG. 2 or 4, the processor 210 may perform control such that the UI output in operation S741 is output through the external display 410 that outputs image data provided by the electronic device 200. In this case, the processor 210 may generate image data corresponding to the UI, and control the communication unit 232 to transmit the generated image data to the external display 410.

The UI output in operation S741 is described below with reference to FIGS. 22B and 22C.

Figure 22B:
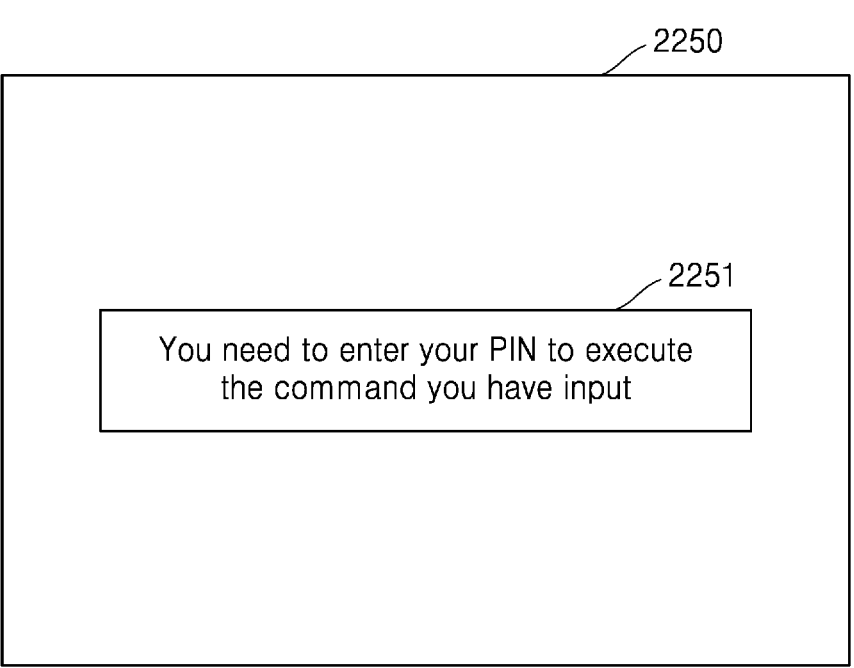
FIG. 22B is a diagram for describing an operation of the operating method of the electronic device illustrated in FIG. 22A.

FIG. 22B is a diagram for describing an operation of the operating method 2200 of the electronic device illustrated in FIG. 22A.

Figure 22C:
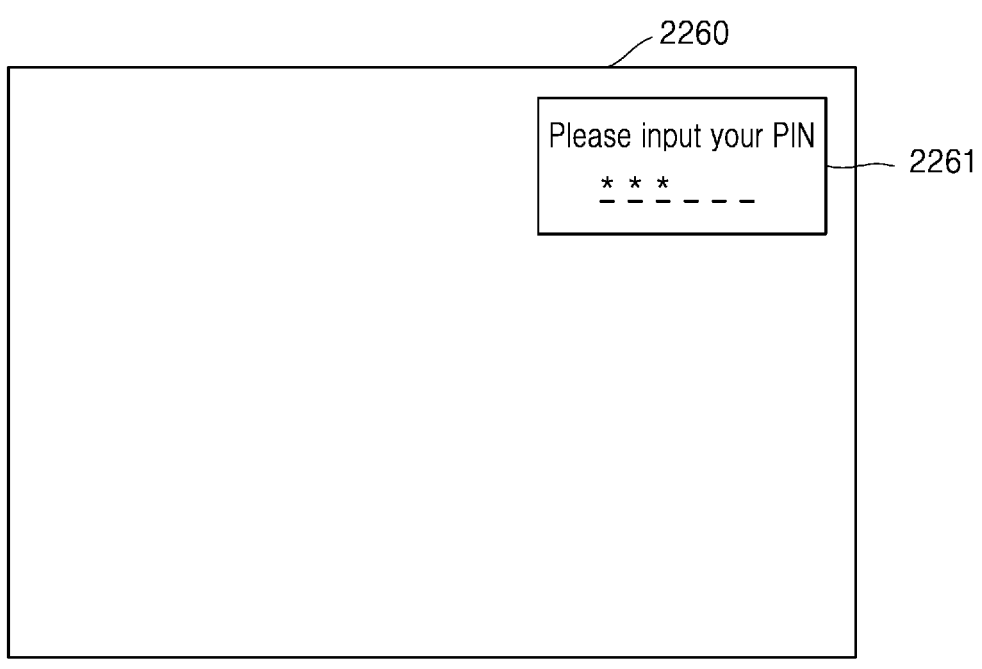
FIG. 22C is a diagram for describing an operation of the operating method of the electronic device illustrated in FIG. 22A.

FIG. 22C is a diagram for describing an operation of the operating method 2200 of the electronic device illustrated in FIG. 22A.

As illustrated in FIG. 22B, a notification message 2251 may be displayed on a screen 2250 output from the electronic device 500.

As illustrated in FIG. 22C, a notification message 2261 may be displayed on a screen 2260 output from the electronic device 500.

As described above with reference to operation S733 of FIG. 21A, that the first probability of use is less than the first value may mean that the user is unlikely or less likely to use the first support element corresponding to the first application. However, even when the first probability of use is less than the first value, the command received in operation S710 may have been request by the registered user. In this case, not executing the control command is not in correspondence to an intention of the registered user. Therefore, in this case, a UI screen for confirming that the user is a registered user may be output to confirm that the user is a registered user.

Execution of the command received in operation S710 may be controlled based on a user input being received through the first UI screen output in operation S741 (S742).

For example, when user information corresponding to a registered user is input, the processor 210 may execute the command received in operation S710 as it is. In addition, when user information corresponding to a registered user is not input, the processor 210 may not execute the command received in operation S710.

As described above, even in a case in which that the first probability of use is less than the first value is determined as meaning that the user is unlikely or less likely to use the first support element corresponding to the first application, through a process of confirming that the user is a registered user, the control command received in operation S710 may or may not be performed in correspondence to an intention of the registered user.

Figure 23:
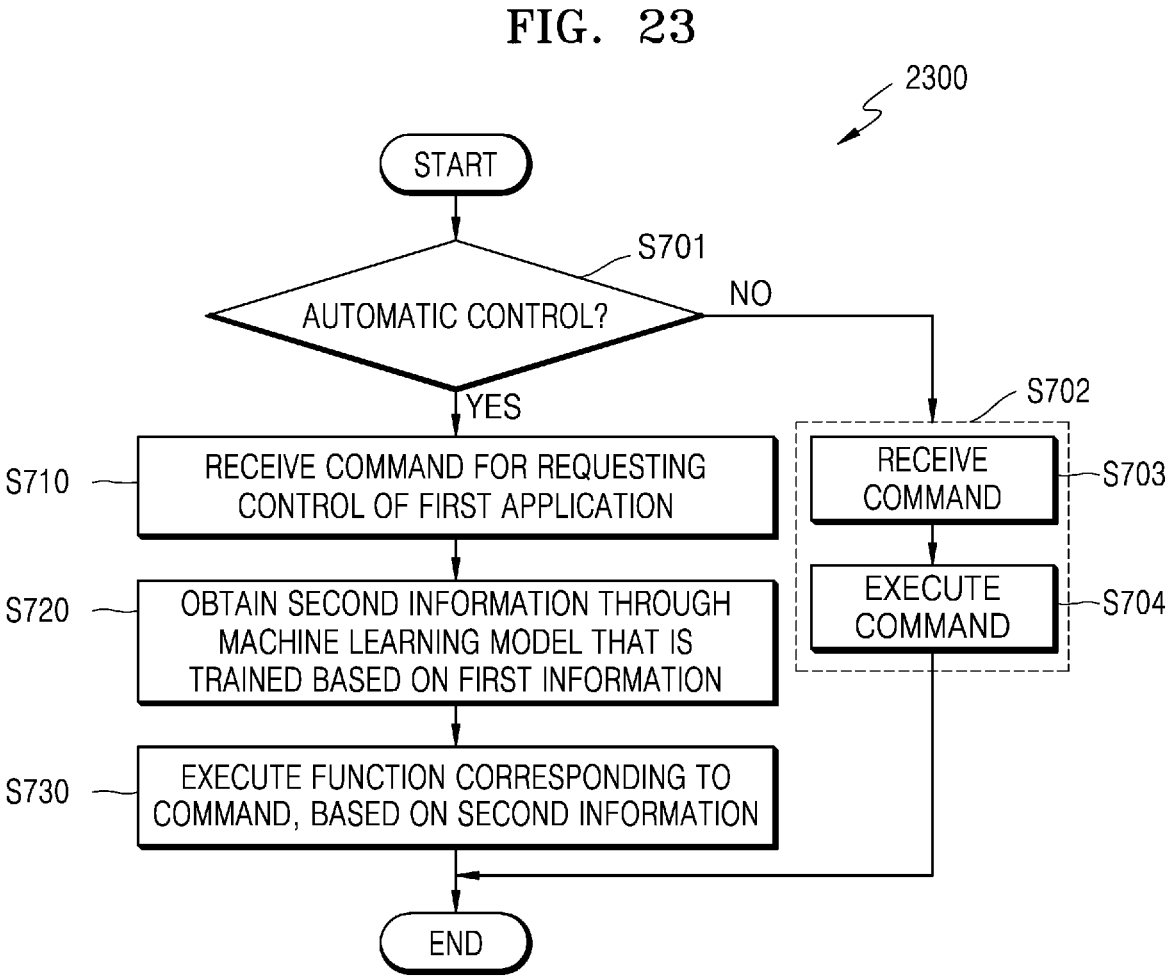
FIG. 23 is another flowchart illustrating an operating method of an electronic device, according to an embodiment of the disclosure.

FIG. 23 is another flowchart illustrating an operating method 2300 of an electronic device according to an embodiment of the disclosure. The operating method 2300 of the electronic device illustrated in FIG. 23 may correspond to operations performed by the electronic device 100, 200, 300, 400, 500 or 600 according to an embodiment of the disclosure described above with reference to FIGS. 1 to 6. In addition, in the operating method 2300 of the electronic device illustrated in FIG. 23, the same components as those of the operating methods 700 and 2100 of the electronic device illustrated in FIGS. 7 and 21A are illustrated by using the same reference numerals. Therefore, descriptions provided above with reference to the operating method 700 or 2100 of the electronic device are omitted.

Hereinafter, for convenience of description, an example is described in which the operations included in the operating method 2300 of the electronic device are performed by the electronic device 500 described above with reference to FIG. 5.

Referring to FIG. 23, the operating method 2300 of the electronic device may include determining whether to perform automatic control (S701). Operation S701 may be performed by the processor 210. Whether to perform the automatic control may be set through an initial setting. Alternatively, execution of the automatic control may be set as an offset setting.

For example, the automatic control may refer to a method of determining whether to execute a received control command based on second information, as illustrated in FIG. 7. For example, the automatic control may refer to a method of, even when the user does not individually set to block or permit the support elements, automatically determining, based on the second information, whether to execute the received control command, and permitting the support elements and performing control of the application, or blocking the support elements and controlling the application not to be executed.

When it is determined, in operation S701, to perform the automatic control, the operating method 2300 of the electronic device may proceed to operation S710.

When it is determined, in operation S701, not to perform a function corresponding to the automatic control, the operating method 2300 of the electronic device may proceed to operation S702.

For example, the operating method 2300 of the electronic device may including receiving a control command (S703). Operation S703 corresponds to operation S710 described above, and thus, detailed descriptions thereof are omitted.

Next, the operating method 2300 of the electronic device may include executing a function corresponding to the control command received in operation S703 (S704). For example, the operating method 2300 of the electronic device may include performing the control command received in operation S703 as it is (S704).

FIG. 24 is another flowchart illustrating an operating method 2400 of an electronic device according to an embodiment of the disclosure. The operating method 2400 of the electronic device illustrated in FIG. 24 may correspond to operations performed by the electronic device 100, 200, 300, 400, 500 or 600 according to an embodiment of the disclosure described above with reference to FIGS. 1 to 6. In addition, in the operating method 2400 of the electronic device illustrated in FIG. 24, the same components as those of the operating method 700 of the electronic device illustrated in FIG. 7 are illustrated by using the same reference numerals. Therefore, descriptions provided above with reference to the operating method 700 of the electronic device are omitted.

Hereinafter, for convenience of description, an example is described in which the operations included in the operating method 2400 of the electronic device are performed by the electronic device 500 described above with reference to FIG. 5.

Referring to FIG. 24, the operating method 2400 of the electronic device may further include operations S705 and S706, in addition to the operations of the operating method 700 of the electronic device illustrated in FIG. 7.

The operating method 2400 of the electronic device may include internally performing, by the electronic device 500, an operation of obtaining first information and training a machine learning model.

The operating method 2400 of the electronic device may include obtaining first information (S705).

The electronic device 500 may obtain the first information during a preset time period. For example, whenever a control command is received and an application is executed, the electronic device 500 may apply, to the first information, a history of use corresponding to the execution.

For example, when a new history of use regarding at least one application and at least one support element has occurred, the electronic device 500 may update the first information based on the new history of use. For example, the update may be performed at a preset time interval, or whenever a history of use occurs.

The processor 210 may perform control such that the first information is stored in the memory 215 and updated.

The operating method 2400 of the electronic device may include training a machine learning model based on the first information obtained in operation S705 (S706). For example, operation S706 may be performed by the processor 210.

The machine learning model may be loaded or stored in the electronic device 100, 200, 300, 400, 500 or 600 according to an embodiment of the disclosure. In a case in which the machine learning model is loaded in the electronic device 100, 200, 300, 400, 500 or 600, the machine learning model may be referred to as an on-device model.

For example, at least one of the processor 210 or the memory 215 may store the machine learning model. The machine learning model stored in at least one of the processor 210 or the memory 215 may be a trained machine learning model. For example, the processor 210 may perform control such that first information is obtained and then an operation of training the machine learning model based on the obtained first information.

The processor 210 may input, to the trained machine learning model stored therein, at least partial data included in the first information, and obtain, as second information, an output value corresponding to the partial data.

For example, the processor 210 may train the machine learning model to predict, from a history of use regarding the application and at least one support element corresponding to the application, a pattern of use regarding each of a plurality of applications provided by the electronic device. For example, the pattern of use regarding the electronic device 500 may refer to a probability that an application and at least one support element corresponding to the application are used in the best correspondence to an intention of a legal user or a legitimate user of the electronic device 500.

For example, the processor 210 may perform an operation of training the machine learning model at preset intervals. For example, when the first information is updated, the processor 210 may re-execute the operation of training the machine learning model based on the updated first information.

Figure 25:
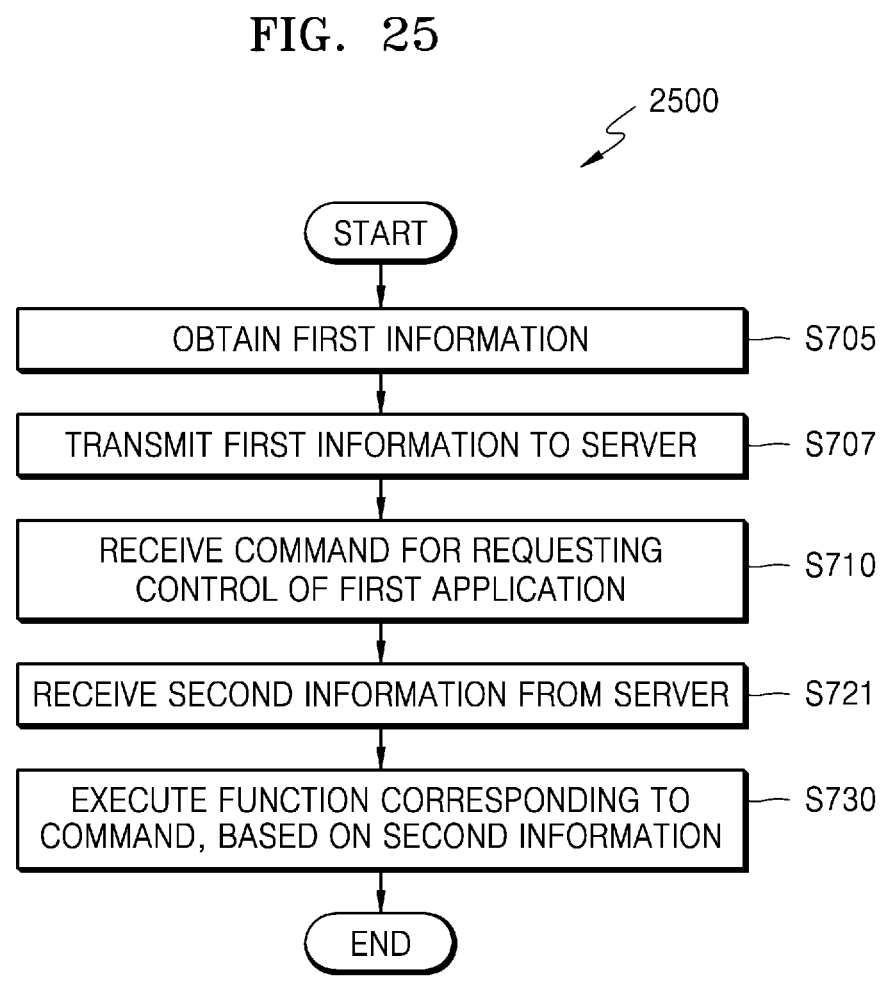

FIG. 25 is another flowchart illustrating an operating method 2500 of an electronic device according to an embodiment of the disclosure. The operating method 2500 of the electronic device illustrated in FIG. 25 may correspond to operations performed by the electronic device 100, 200, 300, 400, 500 or 600 according to an embodiment of the disclosure described above with reference to FIGS. 1 to 6. In addition, in the operating method 2500 of the electronic device illustrated in FIG. 25, the same components as those of the operating methods 700 and 2400 of the electronic device illustrated in FIGS. 7 and 24 are illustrated by using the same reference numerals. Therefore, descriptions provided above with reference to the operating method 700 or 2400 of the electronic device are omitted.

Hereinafter, for convenience of description, an example is described in which the operations included in the operating method 2500 of the electronic device are performed by the electronic device 500 illustrated in FIG. 5.

The operating method 2500 of the electronic device may include transmitting the first information obtained in operation S705 to an external device (e.g., a server) (S707). Operation S707 may be performed by the communication unit 232 under control by the processor 210. Here, the external device may be any computing device in which the machine learning model is loaded or stored.

For example, because the first information is information indicating a history of use in the electronic device 500, the first information may be information obtained by the electronic device 500 for a preset time period. The processor 210 may store the first information in the memory 215 and read the stored first information. In addition, the processor 210 may perform control such that the read first information is transmitted to the external device through the communication unit 232.

For example, the machine learning model may not be stored in the electronic device 500. In this case, the processor 210 may transmit the first information to the external device, and request the external device having received the first information to output the second information through the machine learning model. Then, the processor 210 may control the communication interface 230 to receive the second information transmitted from the external device in response to the request. An embodiment of the disclosure in which the machine learning model is stored in an external device is described below with reference to FIGS. 25 to 28.

First, the external device storing the machine learning model is described with reference to FIGS. 26 and 27.

Figure 26:
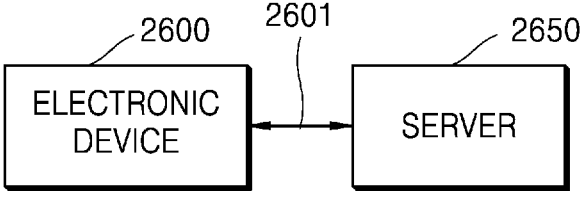
FIG. 26 is a diagram illustrating an electronic device communicating with a server.

FIG. 26 is a diagram illustrating an electronic device 2600 communicating with a server 2650.

The electronic device 2600 illustrated in FIG. 26 may correspond to the electronic device 100, 200, 300, 400, 500 or 600 according to an embodiment of the disclosure described above with reference to FIGS. 1 to 6. Therefore, detailed descriptions of the electronic device 2600 are omitted.

For example, the external device for storing and/or training the machine learning model may be a server, an external electronic device, or an external terminal capable of communicating with the electronic device 500 through a network 2601. The network 2601 may be a wired or wireless communication network.

Figure 27:
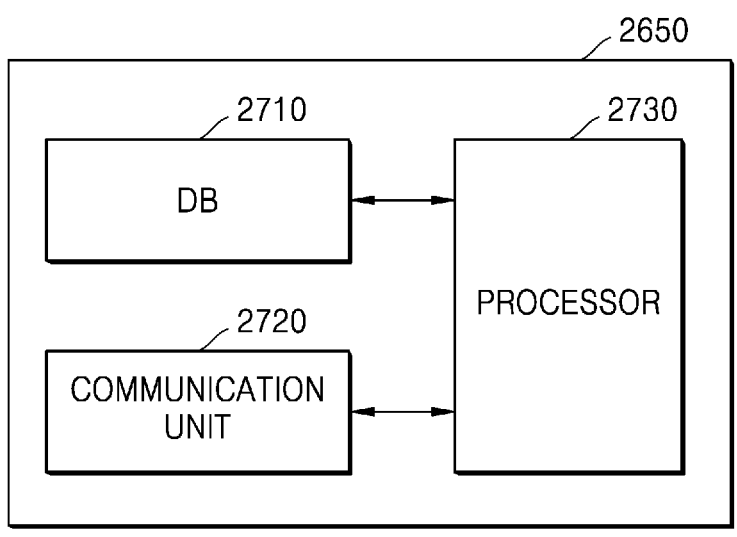
FIG. 27 is a block diagram illustrating a server communicating with an electronic device, according to an embodiment of the disclosure.

FIGS. 26 and 27 illustrate an example in which the external device is the server 2650 connected to the electronic device 2600 through a wireless communication network.

Referring to FIG. 26, the server 2650 may perform computations according to machine learning. In addition, the electronic device 500 and the server 2650 may transmit and receive, to and from each other, a result of performing computations according to machine learning, a trained machine learning model, data required to train the machine learning model (e.g., training data), data required for the machine learning model to output a result (e.g., the first information), and the like. Also, the server 2650 may transmit output data output from the machine learning model to the electronic device 2600.

FIG. 27 is a block diagram illustrating the server 2650 communicating with an electronic device according to an embodiment of the disclosure.

Referring to FIG. 27, the server 2650 may include a database (DB) 2710, a communication unit 2720, and a processor 2730. The server 2650 may operate in conjunction with a display device according to an embodiment of the disclosure, and may perform computations according to a machine learning model to perform any one of input data analysis, classification, prediction, and output of resultant data.

The DB 2710 may include a memory (not shown), and may store, in the memory (not shown), at least one of at least one instruction, a program, or data required for the server 2650 to perform a certain operation.

Also, the DB 2710 may store data required for the server 2650 to perform the computations according to the machine learning model. In detail, the DB 2710 may store a training data set (e.g., first information) required to train the machine learning model. Also, the DB 2710 may store a plurality of machine learning models. For example, the DB 2710 may store the first information obtained in operation S705.

The communication unit 2720 may include one or more components that enable communication with the electronic device 2600. The detailed configuration of the communication unit 2720 corresponds to the configuration of the communication unit 232 described above with reference to FIG. 5, and thus, detailed descriptions thereof are omitted.

The processor 2730 controls the overall operation of the server 2650. For example, the processor 2730 may control the overall operation of the DB 2710, the communication unit 2720, and the like by executing programs stored in the DB 2710 of the server 2650. For example, the processor 2730 may control training and data input/output of the machine learning model by executing programs stored in the DB 2710.

The processor 2730 may perform an operation necessary for transmitting, to the electronic device 2600, output data output from the machine learning model or an operation necessary for data transmission and reception to and from the electronic device 2600. For example, the processor 2730 may transmit, to the electronic device 2600, information (e.g., second information) including a first probability of use output from the machine learning model.

Referring back to FIG. 25, the operating method 2500 of the electronic device may include requesting, based on the control command received in operation S710, transmission of the second information to the external device, and receiving the second information from the external device in response to the request (S721). Operation S721 may correspond to operation S720 illustrated in FIG. 7.

For example, in response to the control command being received, the processor 210 may control the communication unit 232 to transmit, to the server 2650, a request signal for requesting transmission of the second information. Then, the server 2650 may obtain, from the machine learning model, the second information including the first probability of use, based on the received request signal. Alternatively, the server 2650 may obtain and store the second information in advance from the machine learning model, based on the first information. For example, the server 2650 may store in advance the second information illustrated in FIG. 20. In this case, when the request signal is received, the server 2650 may read, from the stored second information, information indicating the first probability of use regarding the at least one support element corresponding to the first application, and transmit the read information to the electronic device 500 through the communication unit 2720.

An operating method of an electronic device according to an embodiment of the disclosure may be embodied as program instructions executable by various computer devices, and recorded on a computer-readable medium. In addition, an embodiment of the disclosure may be implemented in a computer-readable recording medium having recorded thereon one or more programs including instructions for executing the operating method of the electronic device.

The computer-readable medium may include program instructions, data files, data structures, or the like separately or in combinations. The program instructions to be recorded on the medium may be specially designed and configured for the disclosure or may be well-known to and be usable by those skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

Here, the machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments of the disclosure may be included in a computer program product and provided. The computer program products may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

The invention claimed is:

1. A method for operating an electronic device, the method comprising:

receiving a request to control a first application;

obtaining first information corresponding to a history of use regarding the first application and at least one support element which supports execution of the first application or is used in the execution of the first application;

obtaining second information based on an Artificial Intelligence model using the first information, the Artificial Intelligence model receiving the first information as input and outputting the second information including at least a probability of use of the at least one support element; and executing a function corresponding to the request to control the first application, based on the second information.

2. The method of claim 1, wherein the Artificial Intelligence model is trained to predict the probability of use, based on a plurality of pieces of training data obtained by applying time windows to the first information, which is time-series data.

3. The method of claim 1, wherein execution of the function corresponding to the request comprises executing the function based on a result of comparing the probability of use with a preset value as a reference to determine whether the at least one support element is used.

4. The method of claim 1, wherein execution of the function corresponding to the request comprises:

based on the probability of use being less than or equal to a value preset as a reference to determine whether the at least one support element is used, providing a user interface screen to confirm user information registered in the electronic device; and executing the function corresponding to the request, based on a user input received through the user interface screen.

5. The method of claim 1, wherein the obtaining of the second information comprises inputting, to the Artificial Intelligence model, at least one piece of content, which is included in the first information and is obtained during a time period before a time point at which the request is received, and obtaining, as the second information, output data output from the Artificial Intelligence model.

6. The method of claim 1, further comprising:

identifying whether to perform automatic control based on the second information; and based on identifying not to perform a function corresponding to the automatic control, executing, in response to the request being received, the function corresponding to the request.

7. The method of claim 1, wherein the first information is obtained based on information about at least one of frequencies of use or time periods of use of the first application and the at least one support element corresponding to the first application, during a time period.

8. The method of claim 7, wherein the obtaining of the second information comprises:

inputting, to the Artificial Intelligence model, data included in time windows, which are set on the first information to correspond to a time point at which the request is received; and obtaining, as the second information, output data output from the Artificial Intelligence model in response to the inputting of the data.

9. The method of claim 1, further comprising, in response to the history of use regarding the first application and the at least one support element being newly generated, updating the first information based on the history of use that is newly generated.

10. The method of claim 9, further comprising, in response to the first information being updated, training the Artificial Intelligence model based on the first information updated.

11. The method of claim 1, wherein the at least one support element comprises at least one or hardware resources and software resources to be used by the electronic device to execute the first application.

12. An electronic device comprising:

a memory to store at least one instruction; and a processor configured to execute the at least one instruction to:

receive a request to control a first application, obtain first information corresponding to a history of use regarding the first application and at least one support element which supports execution of the first application or is used in the execution of the first application, obtain second information based on an Artificial Intelligence model using the first information, the Artificial Intelligence model receiving the first information as input and outputting the second information including at least a probability of use of the at least one support element, and execute a function corresponding to the request to control the first application, based on the second information.

13. The electronic device of claim 12, wherein Artificial Intelligence model is trained to predict the probability of use, based on a plurality of pieces of training data obtained by applying time windows to the first information, which is time-series data.

14. The electronic device of claim 12, wherein the processor is further configured to execute the at least one instruction to execute the function corresponding to the request, based on a result of comparing the probability of use with a value preset as a reference to determine whether the at least one support element is used.

15. The electronic device of claim 12, further comprising:

a display; and a user interface, wherein the processor is further configured to execute the at least one instruction to, based on the probability of use being less than or equal to a value preset as a reference to determine whether at least one support element is used, perform control such that a first user interface screen to confirm user information registered in the electronic device is displayed on the display, and execute the function corresponding to the request, based on a user input received through the user interface.

16. The electronic device of claim 12, wherein the processor is further configured to execute the at least one instruction to input, to the Artificial Intelligence model, at least one piece of content, which is included in the first information and is obtained during a time period before a time point at which the request is received, and obtain, as the second information, output data output from the Artificial Intelligence model.

17. The electronic device of claim 12, wherein the processor is further configured to execute the at least one instruction to identify whether to perform automatic control based on the second information, and based on identifying not to perform a function corresponding to the automatic control, execute, in response to the request being received, the function corresponding to the request.

18. The electronic device of claim 12, wherein the processor is further configured to execute the at least one instruction to obtain, as the first information, information about at least one of frequencies of use or time periods of use of the first application and the at least one support element corresponding to the first application, during a time period.

19. The electronic device of claim 18, wherein the processor is further configured to execute the at least one instruction to input, to the Artificial Intelligence model, data included in time windows, which are set on the first information to correspond to a time point at which the request is received, and obtain, as the second information, output data output from the Artificial Intelligence model in response to the data input.

20. The electronic device of claim 12, wherein the processor is further configured to execute the at least one instruction to, in response to the history of use regarding first application and the at least one support element being newly generated, update the first information based on the history of use that is newly generated.

21. The electronic device of claim 20, wherein the processor is further configured to execute the at least one instruction to, in response to the first information being updated, train the Artificial Intelligence model based on the first information updated.

* * * * *